United States Patent
Pathan et al.

(10) Patent No.: US 10,837,376 B2
(45) Date of Patent: Nov. 17, 2020

(54) SYSTEMS FOR DIAGNOSING A CONDITION OF AN ENGINE

(71) Applicant: Transportation IP Holdings, LLC, Norwalk, CT (US)

(72) Inventors: Habeeb Khan Pathan, Markapur (IN); James Robert Schreiner, Erie, PA (US); Milan Palinda Karunaratne, Anaheim, CA (US); Bhanuprakash Haranahalli Panchakshari, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 151 days.

(21) Appl. No.: 15/278,049

(22) Filed: Sep. 28, 2016

(65) Prior Publication Data
US 2018/0087460 A1    Mar. 29, 2018

(51) Int. Cl.
| | | |
|---|---|---|
| *F02D 35/02* | (2006.01) | |
| *F01M 1/10* | (2006.01) | |
| *F02D 41/22* | (2006.01) | |
| *F02D 41/28* | (2006.01) | |
| *F01M 1/18* | (2006.01) | |
| *F01M 1/02* | (2006.01) | |
| *F02D 41/14* | (2006.01) | |
| *F01M 13/04* | (2006.01) | |
| *F02D 41/00* | (2006.01) | |
| *F02D 41/26* | (2006.01) | |
| *F02D 41/30* | (2006.01) | |
| *F02D 41/40* | (2006.01) | |

(52) U.S. Cl.
CPC ............ *F02D 35/027* (2013.01); *F01M 1/02* (2013.01); *F01M 1/10* (2013.01); *F01M 1/18* (2013.01); *F01M 13/04* (2013.01); *F02D 41/008* (2013.01); *F02D 41/1498* (2013.01); *F02D 41/22* (2013.01); *F02D 41/26* (2013.01); *F02D 41/28* (2013.01); *F02D 41/3005* (2013.01); *F02D 41/401* (2013.01); *F02D 2041/288* (2013.01); *F02D 2200/101* (2013.01); *F02D 2200/1015* (2013.01); *F02D 2250/08* (2013.01); *Y02T 10/44* (2013.01)

(58) Field of Classification Search
CPC .. F02M 35/10222; F02M 25/06; G01L 23/22; G01L 23/221; F02D 2200/101
USPC ........................................................ 701/111
See application file for complete search history.

(56) References Cited

U.S. PATENT DOCUMENTS

| | | | | |
|---|---|---|---|---|
| 3,965,677 | A | * | 6/1976 | Goto ..................... F01N 3/2053 60/277 |
| 4,316,440 | A | | 2/1982 | Yamaguchi |
| 4,376,429 | A | | 3/1983 | Youngblood |
| 5,386,367 | A | | 1/1995 | Ziegler |
| 5,394,330 | A | * | 2/1995 | Horner .................... F02P 5/152 123/473 |

(Continued)

OTHER PUBLICATIONS

Cummins Filtration Inc., Crankcase Filtration Kit CV50638 Installation Instructions, LT32668—Rev. 4; 2013.

Primary Examiner — Mahmoud Gimie
Assistant Examiner — Joshua Campbell
(74) Attorney, Agent, or Firm — McCoy Russell LLP

(57) ABSTRACT

Various systems and methods are provided for identifying cylinder knock. In one example, cylinder knock may be identified based on a knock monitor that identifies knock based on output from a crankshaft speed sensor.

14 Claims, 9 Drawing Sheets

(56) References Cited

U.S. PATENT DOCUMENTS

| | | | |
|---|---|---|---|
| 5,862,507 A | 1/1999 | Wu | |
| 6,098,013 A * | 8/2000 | Mueller | F02D 41/1458 |
| | | | 123/198 D |
| 6,820,604 B2 | 11/2004 | Chong | |
| 6,912,887 B2 | 7/2005 | Ikeda | |
| 8,694,197 B2 | 4/2014 | Rajagopalan | |
| 8,930,121 B2 | 1/2015 | Rajagopalan | |
| 2009/0158816 A1* | 6/2009 | Kaneko | F02D 35/027 |
| | | | 73/35.09 |
| 2009/0308367 A1* | 12/2009 | Glugla | F02D 19/081 |
| | | | 123/575 |
| 2010/0229510 A1* | 9/2010 | Heinen | B01D 45/08 |
| | | | 55/322 |
| 2011/0313642 A1* | 12/2011 | Sano | F02M 25/089 |
| | | | 701/104 |
| 2013/0068003 A1* | 3/2013 | Kumar | F02D 41/0097 |
| | | | 73/114.25 |
| 2013/0073174 A1* | 3/2013 | Worden | F02D 41/22 |
| | | | 701/102 |
| 2013/0073175 A1* | 3/2013 | Banerjee | F02D 41/0097 |
| | | | 701/102 |
| 2014/0251129 A1 | 9/2014 | Upadhyay | |
| 2015/0267630 A1 | 9/2015 | Magnusson | |
| 2016/0169141 A1 | 6/2016 | Flynn | |

\* cited by examiner

SYSTEMS FOR DIAGNOSING A CONDITION OF AN ENGINE

FIELD

Embodiments of the subject matter disclosed herein relate to an engine, engine components, and an engine system, for example.

BACKGROUND

Engine knock may be detected by one or more dedicated knock sensors that measure engine vibration, for example. However, depending on the configuration of the engine, it may be difficult to identify which cylinder is knocking, unless individual cylinder knock sensors are present, which may be costly and add complexity to the engine. Thus, all cylinders may have ignition timing or other parameters adjusted to reduce the knocking, which may reduce engine efficiency and compromise emissions.

BRIEF DESCRIPTION

In one embodiment, a system includes a sensor configured to measure a parameter of an engine having a plurality of cylinders and a controller. The controller is configured to sample a signal output from the sensor, process the sampled signal to determine a respective magnitude for each of one or more selected frequency components of the sampled signal, the respective magnitude for each of one or more selected frequency components determined according to a recursive sum spectral analysis of the sampled signal, diagnose a condition of the engine based on the respective magnitude for each of the one or more selected frequency components, and adjust one or more engine operating parameters responsive to the diagnosing.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
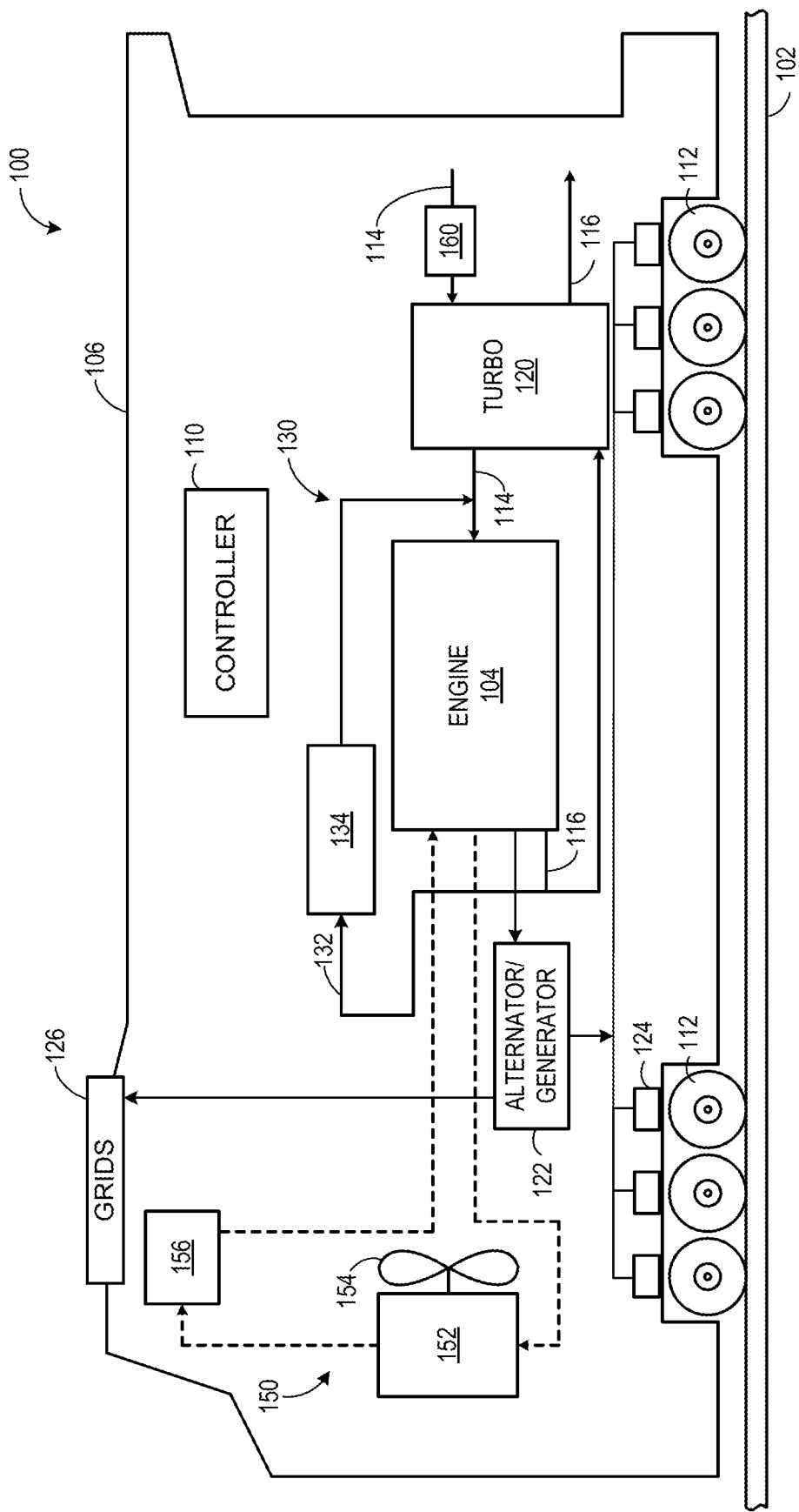
FIG. 1 shows a schematic diagram of an embodiment of a vehicle with an engine.
Figure 2:
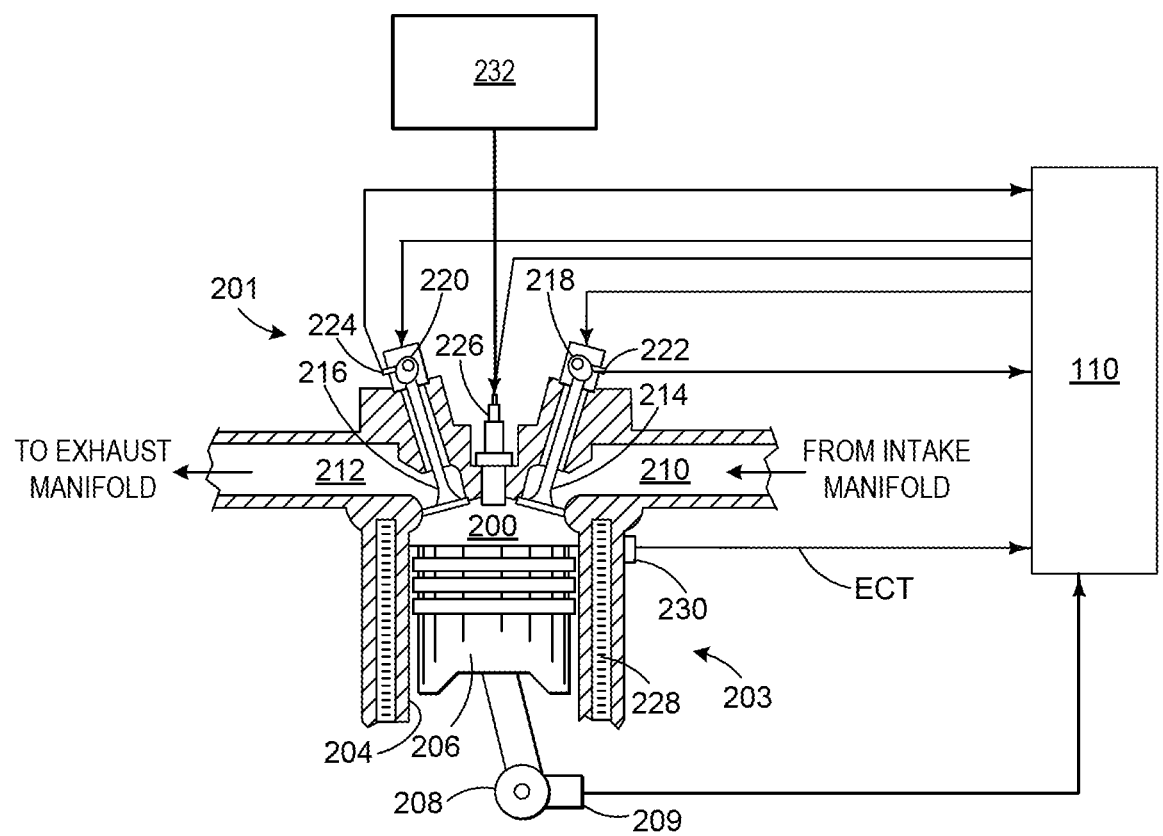
FIG. 2 shows a schematic diagram of a cylinder of the engine of FIG. 1.
Figure 3:
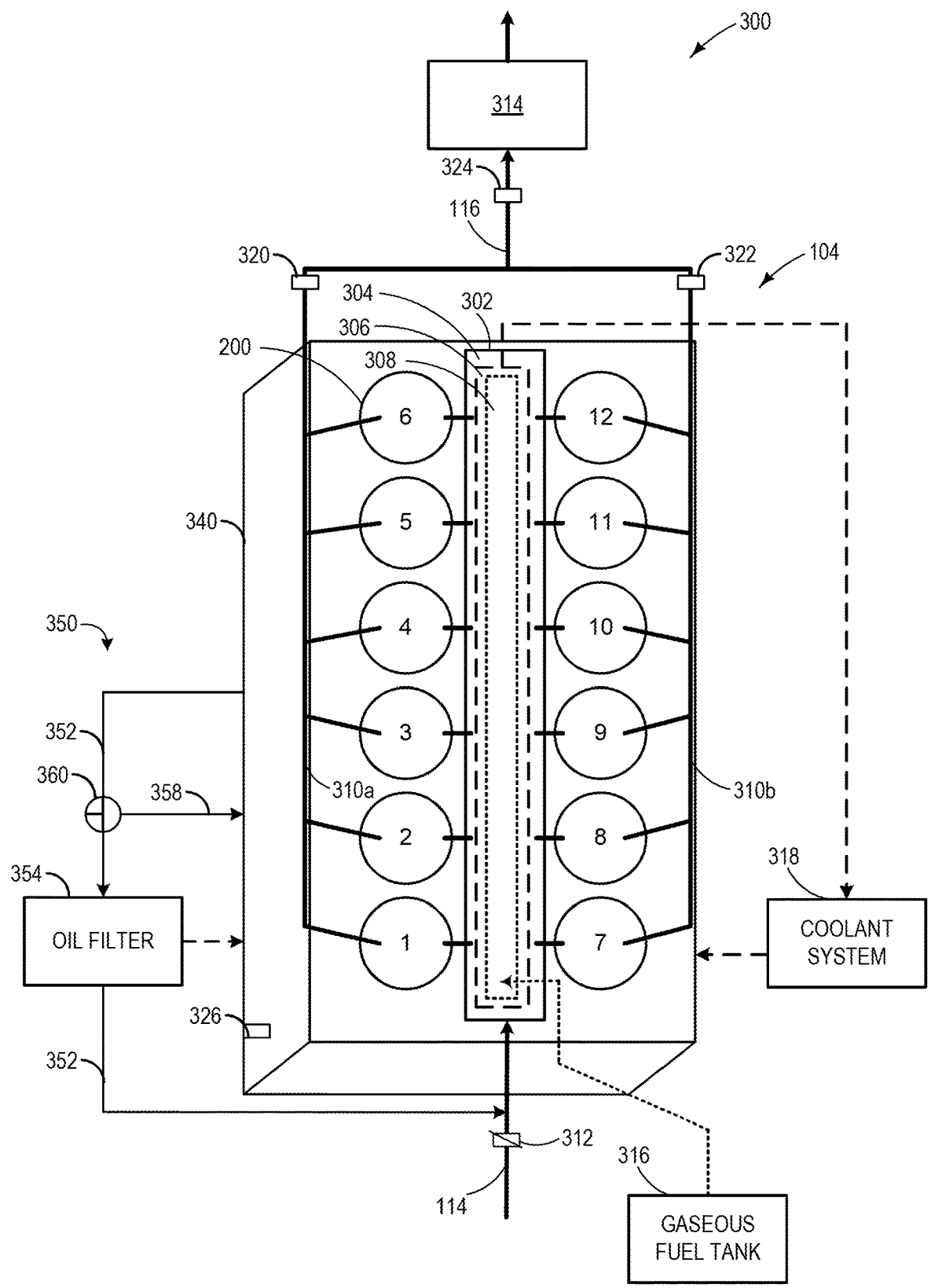
FIG. 3 shows a schematic diagram of an engine system including the engine of FIG. 1.
Figure 4:
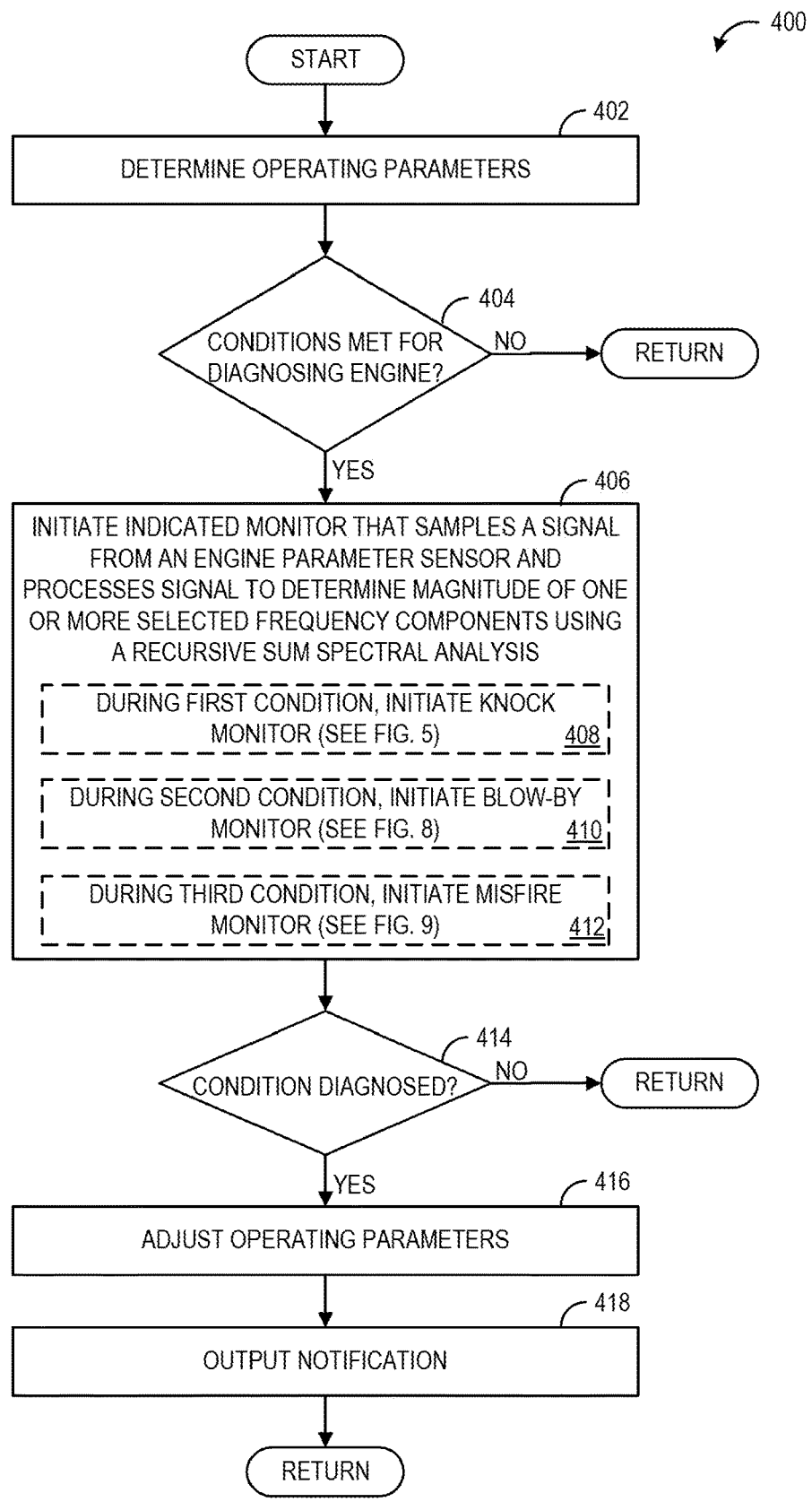
FIG. 4 is a high level flow chart illustrating a method for diagnosing a condition of an engine.

The following description relates to various embodiments of diagnosing a condition of an engine, such as the engine illustrated in FIGS. 1-3, based on output from one or more sensors configured to measure a parameter of the engine. The sampled sensor output may be processed to determine a magnitude of one or more selected frequency components, which may then be compared to a healthy magnitude to diagnose the engine. The processing may include processing the signal from the sensor by applying a recursive sum spectral analysis, which also allows identification of a phase of the sampled signal. In some examples, the phase may be used to identify which cylinder of the engine is undergoing the diagnosed condition, if applicable.

In one example, the diagnosed engine condition may include cylinder knock, which may be detected based on spectral analysis of crankshaft torsional power/magnitude, as illustrated by the methods of FIGS. 4-7. Specifically, a Goertzel algorithm may be applied to the tooth-to-tooth timing data of the crankshaft speed sensor, for two fundamental frequencies, the half-order (to detect single cylinder knock) and higher orders (to detect multi-cylinder knock), and knock is detected if the power/magnitude is greater than a non-knocking threshold. To increase the robustness of the detection, "close by" frequencies may be identified and Parseval's theorem may be used to combine the power/magnitude levels for all the frequencies. Additionally or alternatively, the analysis may be performed during a certain window of a given cylinder cycle when knock is expected to occur, to avoid false positive detections. In another example, knock may be detected in the same manner using data from a crankcase over-pressure (COP) sensor. The spectral analysis performed on the data from the COP sensor may also be used to aid in identification a source of blow-by in the crankcase, as illustrated in FIG. 8.

Figure 9:
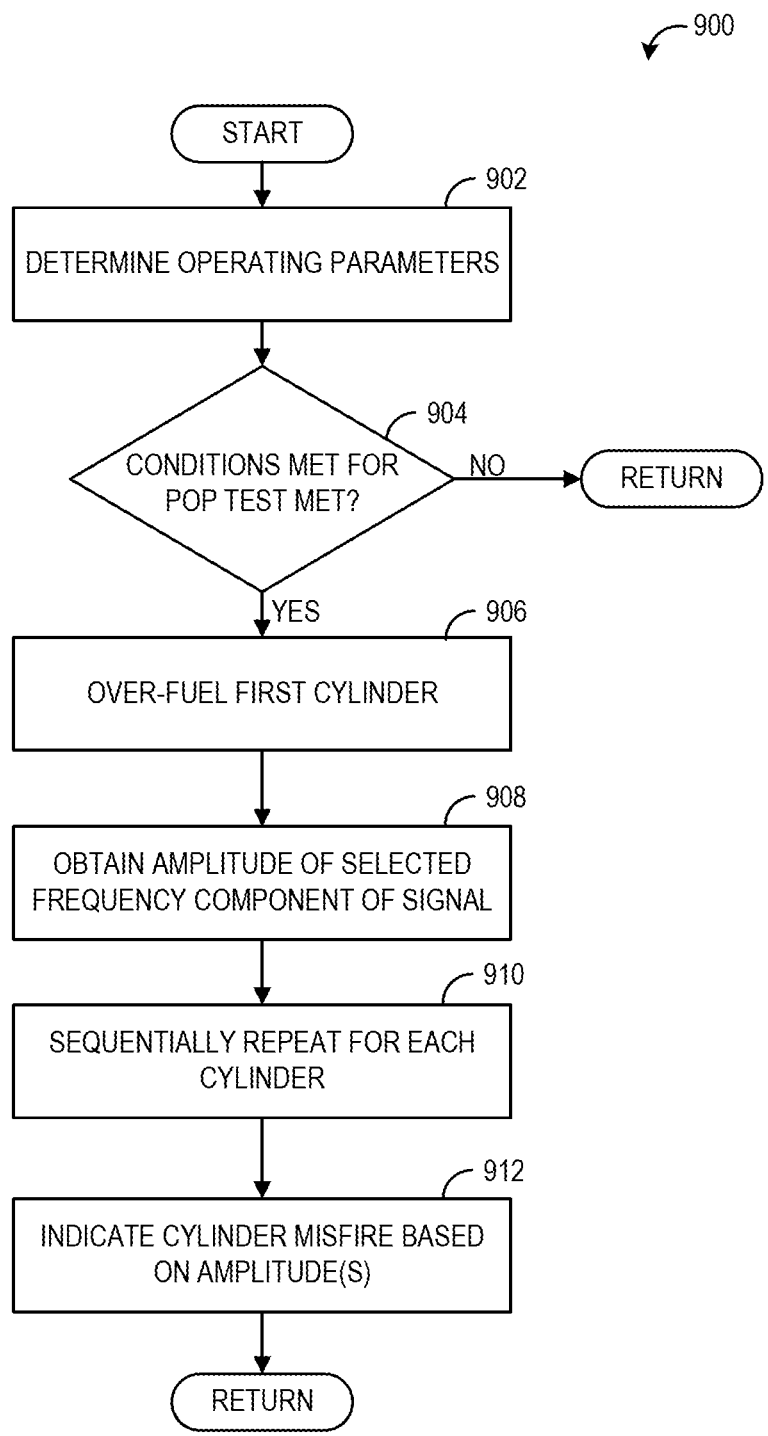
FIG. 9 is a flow chart illustrating a method for running a misfire monitor.

The spectral analysis using the Goertzel algorithm may also be applied to exhaust gas sensor data during an engine pop test to detect misfire, as illustrated in FIG. 9. (an engine pop test includes sequential over-fueling of each cylinder during an engine start, where an operator monitors cylinder health based on whether an audible pop noise is heard during each over-fueling event). For example, misfire may be detected based on spectral analysis of temperature and/or pressure sensor data and/or based on exhaust gas ionization sensor data (e.g., NOx sensor data or lambda sensor data, also considering gas transportation delay based on the position of the sensor).

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a self-propelled rail vehicle, and more broadly, as an example of a mobile platform, supporting a system incorporating an embodiment of the invention.

Before further discussion of the approach for providing tuning liquid fuel injections in a multi-fuel engine, an example of a platform is disclosed in which an engine may be configured for a vehicle, such as a rail vehicle. For example, FIG. 1 shows a block diagram of an embodiment of a vehicle system 100, herein depicted as a rail vehicle 106 (e.g., locomotive), configured to run on a rail 102 via a plurality of wheels 112. As depicted, the rail vehicle 106 includes an engine 104. In other non-limiting embodiments, the engine 104 may be a stationary engine, such as in a power-plant application, or an engine in a marine vessel or other off-highway vehicle propulsion system as noted above.

The engine 104 receives intake air for combustion from an intake passage 114. The intake passage 114 receives ambient air from an air filter 160 that filters air from outside of the rail vehicle 106. Exhaust gas resulting from combustion in the engine 104 is supplied to an exhaust passage 116. Exhaust gas flows through the exhaust passage 116, and out of an exhaust stack of the rail vehicle 106. In one example, the engine 104 is a diesel engine that combusts air and diesel fuel through compression ignition. In other non-limiting embodiments, the engine 104 may additionally combust fuel including gasoline, kerosene, natural gas, biodiesel, or other petroleum distillates of similar density through compression ignition (and/or spark ignition).

In one embodiment, the rail vehicle 106 is a diesel-electric vehicle. As depicted in FIG. 1, the engine 104 is coupled to an electric power generation system, which includes an alternator/generator 122 and electric traction motors 124. For example, the engine 104 is a diesel and/or natural gas engine that generates a torque output that is transmitted to the generator 122 which is mechanically coupled to the engine 104. In one embodiment herein, engine 104 is a multi-fuel engine operating with diesel fuel and natural gas, but in other examples engine 104 may use various combinations of fuels other than diesel and natural gas, such as only diesel fuel.

The generator 122 produces electrical power that may be stored and applied for subsequent propagation to a variety of downstream electrical components. As an example, the generator 122 may be electrically coupled to a plurality of traction motors 124 and the generator 122 may provide electrical power to the plurality of traction motors 124. As depicted, the plurality of traction motors 124 are each connected to one of a plurality of wheels 112 to provide tractive power to propel the rail vehicle 106. One example configuration includes one traction motor per wheel set. As depicted herein, six pairs of traction motors correspond to each of six pairs of motive wheels of the rail vehicle. In another example, alternator/generator 122 may be coupled to one or more resistive grids 126. The resistive grids 126 may be configured to dissipate excess engine torque via heat produced by the grids from electricity generated by alternator/generator 122.

In some embodiments, the vehicle system 100 may include a turbocharger 120 that is arranged between the intake passage 114 and the exhaust passage 116. The turbocharger 120 increases air charge of ambient air drawn into the intake passage 114 in order to provide greater charge density during combustion to increase power output and/or engine-operating efficiency. The turbocharger 120 may include a compressor (not shown) which is at least partially driven by a turbine (not shown). While in this case a single turbocharger is included, the system may include multiple turbine and/or compressor stages.

In some embodiments, the vehicle system 100 may further include an aftertreatment system (illustrated in FIG. 3 as aftertreatment device 314) coupled in the exhaust passage upstream and/or downstream of the turbocharger 120. In one embodiment, the aftertreatment system may include a diesel oxidation catalyst (DOC) and a diesel particulate filter (DPF). In other embodiments, the aftertreatment system may additionally or alternatively include one or more emission control devices. Such emission control devices may include a selective catalytic reduction (SCR) catalyst, three-way catalyst, $NO_x$ trap, or various other devices or systems.

The vehicle system 100 may further include an exhaust gas recirculation (EGR) system 130 coupled to the engine 104, which routes exhaust gas from an exhaust passage 116 of the engine 104 to the intake passage 114 downstream of the turbocharger 120. In some embodiments, the exhaust gas recirculation system 130 may be coupled exclusively to a group of one or more donor cylinders of the engine (also referred to a donor cylinder system). As depicted in FIG. 1, the EGR system 130 includes an EGR passage 132 and an EGR cooler 134 to reduce the temperature of the exhaust gas before it enters the intake passage 114. By introducing exhaust gas to the engine 104, the amount of available oxygen for combustion is decreased, thereby reducing the combustion flame temperatures and reducing the formation of nitrogen oxides (e.g., NOR).

In some embodiments, the EGR system 130 may further include an EGR valve for controlling an amount of exhaust gas that is recirculated from the exhaust passage 116 of the engine 104 to the intake passage 114 of engine 104. The EGR valve may be an on/off valve controlled by the controller 110, or it may control a variable amount of EGR, for example. As shown in the non-limiting example embodiment of FIG. 1, the EGR system 130 is a high-pressure EGR system. In other embodiments, the vehicle system 100 may additionally or alternatively include a low-pressure EGR system, routing EGR from downstream of the turbine to upstream of the compressor.

As depicted in FIG. 1, the vehicle system 100 further includes a cooling system 150. The cooling system 150 circulates coolant through the engine 104 to absorb waste engine heat and distribute the heated coolant to a heat exchanger, such as a radiator 152. A fan 154 may be coupled to the radiator 152 in order to maintain an airflow through the radiator 152 when the vehicle 106 is moving slowly or stopped while the engine is running. In some examples, fan speed may be controlled by a controller, such as controller 110. Coolant which is cooled by the radiator 152 enters a tank 156. The coolant may then be pumped by a water, or coolant, pump (not shown) back to the engine 104 or to another component of the vehicle system, such as the EGR cooler.

The rail vehicle 106 further includes an engine controller 110 (referred to hereafter as the controller) to control various components related to the rail vehicle 106. As an example, various components of the vehicle system may be coupled to the controller 110 via a communication channel or data bus. In one example, the controller 110 includes a computer control system. The controller 110 may additionally or alternatively include a memory holding non-transitory computer readable storage media (not shown) including code for enabling on-board monitoring and control of rail vehicle operation.

The controller 110 may receive information from a plurality of sensors and may send control signals to a plurality of actuators. The controller 110, while overseeing control and management of the rail vehicle 106, may be configured to receive signals from a variety of engine sensors, as further elaborated herein, in order to determine operating parameters and operating conditions, and correspondingly adjust various engine actuators to control operation of the rail vehicle 106. For example, the engine controller 110 may receive signals from various engine sensors including, but not limited to, engine speed, engine load, intake manifold air pressure, boost pressure, exhaust pressure, ambient pressure, ambient temperature, exhaust temperature (such as from sensors 320 and 322 of FIG. 3, described below), particulate filter temperature, particulate filter back pressure, engine coolant pressure, gas temperature in the EGR cooler, exhaust soot quantity (from soot/particulate matter sensor), or the like. Correspondingly, the controller 110 may control the rail vehicle 106 by sending commands to various components such as the traction motors 124, the alternator/generator 122, cylinder valves, fuel injectors, a notch throttle, or the like. Other actuators may be coupled to various locations in the rail vehicle.

FIG. 2 depicts an embodiment of a combustion chamber, or cylinder 200, of a multi-cylinder internal combustion engine, such as the engine 104 described above with reference to FIG. 1. Cylinder 200 may be defined by a cylinder head 201, housing the intake and exhaust valves and fuel injector, described below, and a cylinder block 203. In some examples, each cylinder of the multi-cylinder engine may include a separate cylinder head coupled to a common cylinder block.

The engine may be controlled at least partially by a control system including controller 110 which may be in further communication with a vehicle system, such as the vehicle system 100 described above with reference to FIG. 1. As described above, the controller 110 may further receive signals from various engine sensors including, but not limited to, engine speed from crankshaft speed sensor 209, engine load, boost pressure, exhaust pressure, ambient pressure, $CO_2$ levels, exhaust temperature, $NO_x$ emission, engine coolant temperature (ECT) from temperature sensor 230 coupled to cooling sleeve 228, etc. In one example, the crankshaft speed sensor may be a Hall effect sensor, variable reluctance sensor, or linear variable differential transducer configured to determine crankshaft speed based on the speed of one or more teeth on a wheel of the crankshaft. Correspondingly, the controller 110 may control the vehicle system by sending commands to various components such as alternator, cylinder valves, throttle, fuel injectors, etc.

The cylinder (i.e., combustion chamber) 200 may include combustion chamber walls 204 with a piston 206 positioned therein. The piston 206 may be coupled to a crankshaft 208 so that reciprocating motion of the piston is translated into rotational motion of the crankshaft. In some embodiments, the engine may be a four-stroke engine in which each of the cylinders fires in a firing order during two revolutions of the crankshaft 208. In other embodiments, the engine may be a two-stroke engine in which each of the cylinders fires in a firing order during one revolution of the crankshaft 208.

The cylinder 200 receives intake air for combustion from an intake including an intake runner 210. The intake runner 210 receives intake air via an intake manifold. The intake runner 210 may communicate with other cylinders of the engine in addition to the cylinder 200, for example, or the intake runner 210 may communicate exclusively with the cylinder 200.

Exhaust gas resulting from combustion in the engine is supplied to an exhaust including an exhaust runner 212. Exhaust gas flows through the exhaust runner 212, to a turbocharger in some embodiments (not shown in FIG. 2) and to atmosphere, via an exhaust manifold. The exhaust runner 212 may further receive exhaust gases from other cylinders of the engine in addition to the cylinder 200, for example.

Each cylinder of the engine may include one or more intake valves and one or more exhaust valves. For example, the cylinder 200 is shown including at least one intake poppet valve 214 and at least one exhaust poppet valve 216 located in an upper region of cylinder 200. In some embodiments, each cylinder of the engine, including cylinder 200, may include at least two intake poppet valves and at least two exhaust poppet valves located at the cylinder head.

The intake valve 214 may be controlled by the controller 110 via an actuator 218. Similarly, the exhaust valve 216 may be controlled by the controller 110 via an actuator 220. During some conditions, the controller 110 may vary the signals provided to the actuators 218 and 220 to control the opening and closing of the respective intake and exhaust valves. The position of the intake valve 214 and the exhaust valve 216 may be determined by respective valve position sensors 222 and 224, respectively. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In some embodiments, each cylinder of the engine may be configured with one or more fuel injectors for providing fuel thereto. As a non-limiting example, FIG. 2 shows the cylinder 200 is including a fuel injector 226. The fuel injector 226 is shown coupled directly to the cylinder 200 for injecting fuel directly therein. In this manner, fuel injector 226 provides what is known as direct injection of a fuel into combustion cylinder 200. The fuel may be delivered to the fuel injector 226 from a high-pressure fuel system including a fuel tank 232, fuel pumps, and a fuel rail (not shown). In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). Further, as explained in more detail below, each cylinder of the engine may be configured to receive gaseous fuel (e.g., natural gas) alternative to or in addition to diesel fuel. The gaseous fuel may be provided to cylinder 200 via the intake manifold, as explained below, or other suitable delivery mechanism.

FIG. 3 shows a schematic diagram of an engine system 300 including multi-cylinder engine 104 having a plurality of cylinders 200. Thus, the engine system 300 includes the engine 104 described above with respect to FIG. 1. The engine 104 includes a crankcase 340 housing the crankshaft of the engine (to which the pistons in the cylinders of the engine are coupled). The crankcase 340 may house an oil sump, which may act as the oil supply to the engine.

The engine 104 receives intake air for combustion from intake manifold 302. Intake manifold 302 receives intake air from intake passage 114, which receives ambient air from an air filter (shown in FIG. 1) that filters air from outside of a vehicle in which the engine 104 may be positioned. The flow of intake air into intake manifold 302 may be controlled by throttle 312, the position of which may be controlled by controller 110.

In the embodiment depicted in FIG. 3, the engine 104 is a V-12 engine having twelve cylinders. In other examples, the engine may be a V-6, V-8, V-10, V-16, I-4, I-6, I-8, opposed 4, or another engine type. Due to the vee configuration of the engine, the engine includes a first cylinder bank having six cylinders (e.g., cylinders I-6) and a second cylinder bank having six cylinders (e.g., cylinders 7-12). Intake manifold 302 is arranged between the two cylinder banks and is configured to supply intake air to each cylinder of each bank via a plurality of intake runners. While not shown in FIG. 3, each intake runner is coupled to a separate cylinder head that at least partially defines a cylinder. Thus, intake air that flows through the intake manifold is distributed to a plurality of intake runners, each fluidically coupled to a separate cylinder head of the engine.

Intake manifold 302 is configured to supply intake air to the cylinders of the engine, as described above. However, in some examples, intake manifold 302 includes further passageways for draining coolant from the engine and delivering gaseous fuel to the engine. As such, intake manifold 302 includes a first passage 304 configured to flow intake air. First passage 304 is coupled to the plurality of intake runners. First passage 304 receives intake air from intake passage 114.

To drain coolant from the engine, intake manifold 302 may include a second passage 306. Second passage 306 receives coolant that is directed out of each cylinder head, for example, and the second passage directs the coolant back to the general engine coolant system 318. The engine coolant system 318 may include one or more coolant components, such as a radiator (e.g., radiator 152 of FIG. 1), coolant tank (e.g., tank 156), cooling lines, pumps and/or other components. Thus, coolant from the engine coolant system is pumped to the engine 104, where it flows through one or more jackets of the cylinder block and/or cylinder head (e.g., coolant sleeve 228) to cool the engine. The coolant then drains out of the engine via drainage lines leading out from each cylinder head to the second passage 306, and the coolant is returned to the engine coolant system.

In some modes of operation, engine 104 may operate with both liquid fuel combustion (e.g., diesel fuel) and gaseous fuel (e.g., natural gas) combustion. While liquid fuel is delivered to each cylinder according to the configuration described above with respect to FIG. 2, gaseous fuel may be delivered to each cylinder via a third passage 308 of the intake manifold 302. As shown in FIG. 3, the third passage 308 of the intake manifold 302 may receive a supply of gaseous fuel from a gaseous fuel tank 316, via one or more gaseous fuel lines, pumps, pressure regulators, etc. In some embodiments, gaseous fuel tank 316 may be located remotely from engine 104, such as on a different rail car (e.g., on a fuel tender car), and the gaseous fuel may be supplied to the engine 104 via one or more fuel lines that traverse the separate cars. However, in other embodiments, gaseous fuel tank 316 may be located on the same vehicle as engine 104. The third passage 308 may include a plurality of gas admission valves, each configured to supply gaseous fuel from the third passage 308 to a respective cylinder head. However, in some examples, the third passage, gas admission valves, and gaseous fuel tank may be dispensed with and the engine may only operate with liquid fuel (e.g., diesel).

Exhaust gas resulting from combustion in the engine 104 is supplied to an exhaust passage 116, where the exhaust is treated by aftertreatment device 314 and/or flows through one or more turbochargers before exiting to atmosphere. In the configuration illustrated in FIG. 3, each cylinder bank has an exhaust manifold. For example, exhaust manifolds 310a and 310b are illustrated in FIG. 3. Each exhaust manifold receives exhaust released from each cylinder of a respective cylinder bank (via an exhaust runner of the respective cylinder head, such as exhaust runner 212 of FIG. 2). Each exhaust manifold 310a, 310b directs exhaust to the common exhaust passage 116.

As described previously, the engine system may include a plurality of sensors. For example, each exhaust manifold may include a respective exhaust gas parameter sensor. As shown, exhaust manifold 310a includes exhaust gas parameter sensor 320 and exhaust manifold 310b includes exhaust gas parameter sensor 322. In one example, each exhaust gas parameter sensor may be a temperature sensor. Additionally or alternatively, each exhaust gas parameter sensor may be a pressure sensor. Sensors 320 and 322 may send signals representative of exhaust temperature and/or pressure to the controller (e.g., controller 110). A further exhaust gas parameter sensor 324 may be positioned in the exhaust passage 116 downstream of the exhaust manifolds. The further exhaust gas parameter sensor may be an oxygen sensor, NOx sensor, and/or other suitable sensor configured to send signals representative of exhaust oxygen concentration and/or NOx concentration to the controller. The crankcase 340 may house a crankcase pressure sensor 326 configured to send signals representative of crankcase pressure to the controller.

The engine system 300 may further include a crankcase ventilation system 350. The crankcase ventilation system 300 is configured to route exhaust gas and/or other combustion products that may blow by the pistons into the crankcase to the intake. The gases that are vented out though the crankcase are the result of leakage around the piston rings and liners in the combustion chambers and may be composed of hydrocarbon particles, soot, engine oil, and its contaminants. These crankcase gases are then vented back into the air intake system to be consumed by the combustion process.

The crankcase ventilation system 350 includes a crankcase ventilation line 352 which is coupled to the crankcase 340 at a first end and is coupled to the intake passage 114 at a second end. Positioned within the crankcase ventilation line 352 is an oil filter 354. The oil filter may include one or more baffles or other structures to remove oil and/or fuel from the crankcase vapors in the crankcase ventilation line 352. Oil that accumulates in the oil filter 354 may then be directed back to the oil sump of the crankcase (as shown by the dashed line). While not shown in FIG. 3, the crankcase ventilation system 350 may include various valves to control flow of vapors in the crankcase ventilation system, such as a crankcase ventilation valve positioned in the crankcase ventilation line (controllable to allow flow of crankcase vapors through the crankcase ventilation line) and/or a check valve positioned in the crankcase ventilation line (to prevent backflow of compressed intake air).

In some examples, the crankcase ventilation system may further include a return line 358 that couples the crankcase ventilation line back to the crankcase, upstream of the oil filter. Flow of vapors through the return line 358 may be controlled by a two-way valve 360. The two-way valve 360 may be electronically, hydraulically, or pneumatically actuated responsive to a command from the controller, for example. When two Turning now to FIG. 4, a method 400 for diagnosing a condition of an engine (such as engine 104 of FIGS. 1-3) is illustrated. Method 400 may be carried out by a controller, such as controller 110 of FIGS. 1-3, according to non-transitory instructions stored thereon in combination with one or more sensors of the engine system (such as the exhaust pressure, exhaust temperature, crankshaft speed, crankcase pressure, and/or exhaust oxygen or NOx sensors described above) and one or more actuators of the engine system (such as two-way valve 360, fuel injectors, and the like). Specifically, method 400 may initiate one or more condition monitors, based on current engine operating conditions, that each monitor for a specific engine condition. The condition monitors may monitor for occurrence of engine knock, cylinder blow-by, and cylinder misfire by obtaining signals from respective sensors, processing the sensor signals to transform the sensor output into the frequency domain, and then analyzing selected frequency components by performing a recursive sum spectral analysis on each signal and comparing selected magnitudes to various "healthy" engine thresholds. If a condition is diagnosed by one or more condition monitors, an operator of the vehicle/engine may be notified and/or various engine operating parameters may be adjusted, as described below.

At 402, method 400 includes determining engine operating parameters. The determined operating parameters may include, but are not limited to, engine speed, engine torque demand, engine temperature, time since a previous condition monitor was initiated, and other operating parameters. At 404, method 400 includes determining if conditions for diagnosing the engine are met. In some examples, the conditions may include a threshold duration (of time, engine cycles, vehicle distance traveled, etc.) having lapsed since a prior respective condition monitor was performed and the engine operating at defined conditions for a respective condition monitor. The conditions for initiating each of the respective condition monitors may be different for each condition monitor and will be described in more detail below.

If the entry conditions have not been met, method 400 continues to monitor operating conditions at 402. If the conditions have been met, method 400 proceeds to 406 to initiate one or more indicated condition monitors, where each condition monitor samples a signal from an engine parameter sensor and processes the signal to determine a magnitude of one or more selected frequency components using a recursive sum spectral analysis.

Initiating a condition monitor may include, at 408, initiating a knock monitor during a first condition. The knock monitor may detect cylinder knock, which includes autoignition of end gasses in a cylinder. During healthy combustion, the flame front passes smoothly from the point of ignition to the cylinder walls. Engine knock occurs when the temperature or pressure in the unburned end gases exceeds a threshold level, causing an auto ignition, thereby generating a shock wave which increases the cylinder peak pressure. If allowed to persist, engine knock may lead to engine degradation.

The impulse caused by the shock wave during engine knock excites a resonance in the cylinder at a particular characteristic frequency. The knock monitor detects this resonance by sampling a signal from a crankcase speed sensor or from a crankcase pressure sensor and transforming the signal into the frequency domain. The magnitude of one or more selected frequency components, such as the half-order component, may be compared to a non-knocking threshold, and knock may be indicated when the magnitude is greater than the threshold.

The knock monitor may be initiated during nearly all engine operating conditions, and may be run continuously when the engine is running. However, in some examples, the knock monitor may be initiated only during steady-state conditions, where engine speed (and hence crankshaft speed) is not changing, in order to remove noise from the signal. Additional detail about the knock monitor is presented below with respect to FIG. 5.

Initiating a condition monitor may include, at 410, initiating a blow-by monitor during a second condition. As explained above with respect to FIG. 3, blow-by may include the entrance of combustion precursors and/or products into the crankcase and may be caused by scuffed cylinder liners, piston ring degradation, stuck piston ring, and/or piston seizing. The blow-by monitor may sample the signal output by the crankcase pressure sensor and transform the signal using a Fast Fourier Transform or other technique and apply the recursive sum spectral analysis. By proper selection of bin values of selected frequency components (e.g., half order or first order harmonic components), power values calculated from the spectral analysis may identify and differentiate between the blow-by component cause (e.g., scuffed liner vs. piston ring degradation). Further, the blow-by monitor may not be able to differentiate between cylinder issues leading to the detection of blow by and a clogged oil coalescer, which is used in the oil filter of the crankcase ventilation system. Thus, as described in more detail below with respect to FIG. 8, the blow-by monitor may be initiated during conditions where the oil filter is fluidically coupled to the crankcase and when the oil filter is not fluidically coupled to the crankcase, thus enabling differentiation of crankcase over-pressure events due to cylinder degradation (e.g., blow-by) and due to oil filter clogging.

The blow-by monitor may be initiated during virtually all engine running conditions in one example. In other examples, the blow-by monitor may be initiated only periodically (e.g., after a threshold duration of engine operation has elapsed) or during other conditions. In some examples, the blow-by monitor may be performed continuously during engine operation.

Initiating a condition monitor may include, at 412, initiating a misfire monitor during a third condition to monitor for cylinder misfire. The misfire monitor will be described in more detail below with respect to FIG. 9. Briefly, the misfire monitor may detect misfire in one or more cylinders, which may include a failure of a cylinder to undergo a scheduled combustion event, which may reduce engine power and degrade emissions. Misfire may be caused by a degraded fuel injector in one example. Further, in examples where the engine is a multi-fuel engine, the misfire may be caused by a substitution ratio that is too high for the current conditions. The misfire monitor may detect misfire based on spectral analysis of the output of one or more exhaust gas parameter sensors, such as exhaust gas temperature, exhaust gas pressure, and/or exhaust gas composition (e.g., oxygen concentration). The misfire monitor may be initiated during virtually all engine operating conditions, or it may be initiated only during certain conditions (e.g., steady state conditions).

While the three condition monitors described above (the knock monitor, blow-by monitor, and misfire monitor) are described as being carried out during three separate conditions, it is to be understood that the first, second, and third conditions may be overlapping in some examples, such that one or more of the condition monitors are executed simultaneously.

At 414, method 400 determines if a condition of the engine has been diagnosed based on the results of the one or more condition monitors. For example, engine knock may be detected, cylinder blow-by may be detected, crankcase ventilation system oil filter clogging may be detected, and/or cylinder misfire may be detected. If none of these conditions have been diagnosed, method 400 returns. If one or more conditions are diagnosed, method 400 proceeds to 416 to adjust one or more operating parameters. The operating parameters that are adjusted may depend on which condition is diagnosed. If cylinder knock is detected, for example, fuel injection parameters, such as fuel injection timing, may be adjusted. If blow-by is detected, for example, peak cylinder pressure may be lowered by adjusting fuel injection parameters (e.g., fuel injection amount). If misfire is detected, for example, a liquid fuel injection quantity may be increased (e.g., relative to a gaseous fuel injection amount when the engine is a multi-fuel engine), fuel injection timing may be adjusted, or other parameters may be adjusted. At 418, a notification of the condition may be output. The output notification may include notifying an operator of the vehicle in which the engine is installed via a dashboard message or an indicator light (e.g., a malfunction indication lamp, also referred to as a MIL), for example, and/or setting a diagnostic code. Method 400 then returns.

Figure 5:
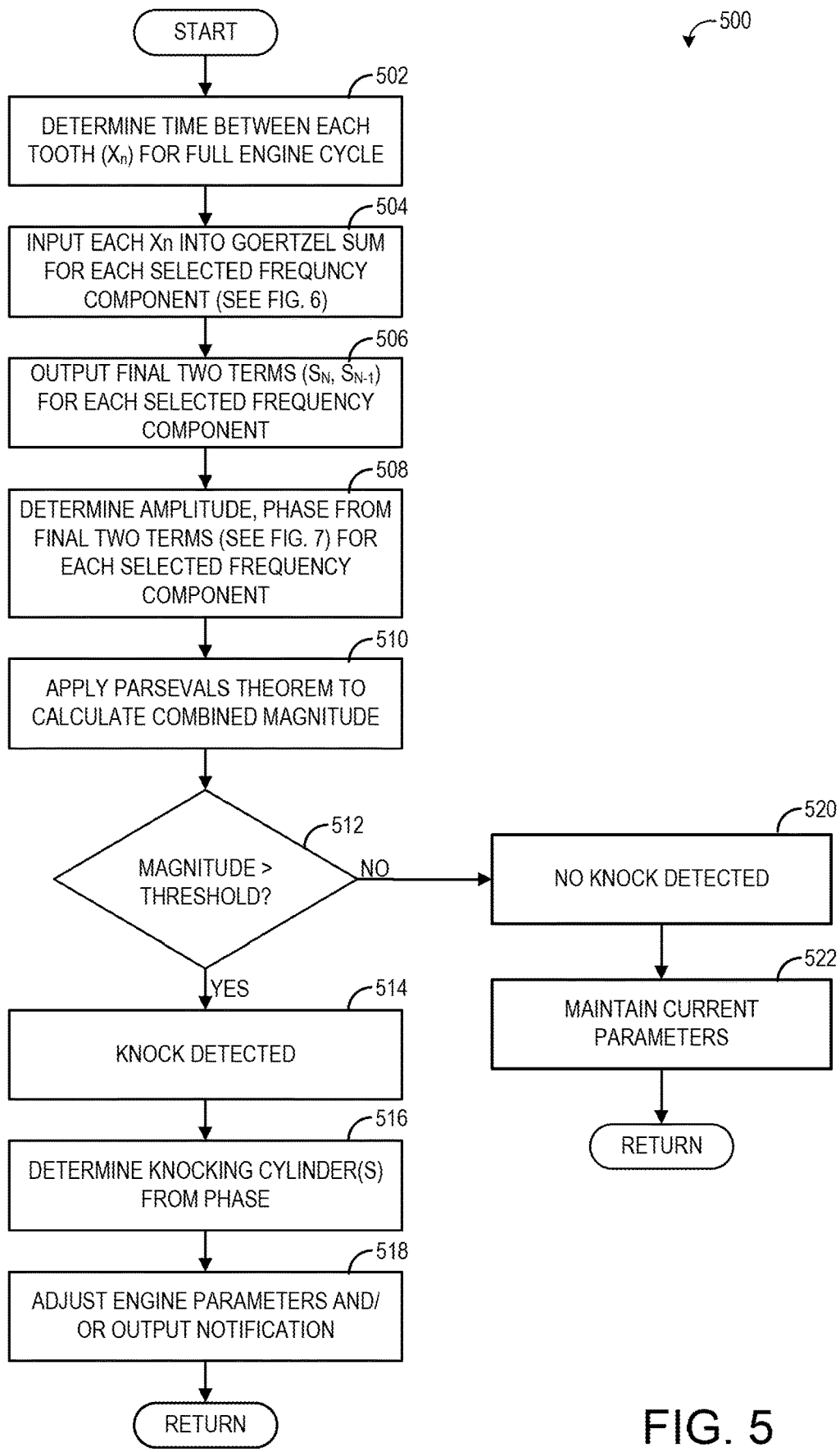
FIGS. 5-7 are flow charts illustrating a method for running a knock monitor.

FIG. 5 is a flow chart illustrating a method 500 for running a knock monitor. Method 500 may be carried out a control unit, such as controller 110, according to non-transitory instructions stored thereon. In some examples, controller 110 may include multiple nodes, have a hierarchical organization, be capable of performing multi-threaded processing, and/or other configuration that may allow a portion of method 500 may be carried out by a first level of the controller, while another portion of method 500 may be carried out by a second, different level of the controller. Additional details about the multi-level process will be described below. Method 500 may detect half-order or higher torsion vibrations, alone or in combination. In one example, method 500 may only detect half-order torsional vibrations, in order to detect occurrence of knock in a single cylinder of the engine. In other examples, method 500 may detect sixth order torsional vibrations, to detect occurrence of knock in each cylinder of the engine (when the engine includes 12 cylinders). Detection of other torsional vibration orders are within the scope of this disclosure.

As explained above, cylinder knock creates a shock wave excited resonance which is dependent on temperature and cylinder dimensions and is highly sensitive in the range of 5 KHz to 7 KHz with a variation of +/−400 Hz. This effect may be measured with crank torsional effect in the frequency domain. As such, a downstream impact may be analyzed for this upstream 5 KHz to 7 KHz shock wave generation. Thus, ½ order components may be captured for detecting the single cylinder knock occurrence. For detecting knock in each cylinder of a 12 cylinder engine configuration, then a 6th order fundamental frequency component may be analyzed. The analysis may include application of a recursive sum spectral analysis, herein a Goertzel algorithm, which gives the values of each cylinder knock occurrence. The Goertzel algorithm may also provide the phase with which the exact cylinder affected with knock may be determined. Along with single fundamental frequency selection, close by frequencies may be selected and then a Parsevals theorem may be applied to detect the combined power or magnitude levels compared with healthy cylinder (without knock) to confirm the knock detection.

The energy threshold used to identify knock may be calculated from normal and healthy combustion without knock. The crank wheel tooth-to-tooth timing values of healthy combustion processed with Goertzel will yield the reference energy levels of threshold, in one example, and the phase detected should be in the range of 10 deg to 70 deg after top dead center for knock occurrence, as knock or shock wave resonance will occur during this range.

At 502, method 500 includes determining an amount of time ($X_n$) between the passing of each tooth of a crankshaft wheel past a crankshaft sensor for a full engine cycle (e.g., two revolutions of the crankshaft). In one example, the crankshaft wheel may include a plurality of teeth, and the amount of time between when a first tooth and a second, adjacent tooth passes by the crankshaft sensor may be determined for each tooth of the wheel. In one example, the wheel may include 90 teeth, and thus approximately 180 $X_n$ samples may be collected in an engine cycle.

At 504, each value of $X_n$ is input into a recursive sum algorithm, such as a Goertzel sum. Additional details regarding the Goertzel sum is described below with respect to FIG. 6. Briefly, the Goertzel sum calculates a term ($S_n$) for each $X_n$ that is based on a previous two $X_n$ terms and a calibratable coefficient. The calibratable coefficient may reflect which frequency component is being analyzed, and as such the Goertzel sum may be applied for more than one coefficient/frequency component. As explained above, Goertzel sum may be applied for the half-order frequency component and the sixth order frequency component.

An alternate method of a time-based approach, different from the crank angle approach, may be used in conditions where higher dynamics associated with measuring the signal creates high frequency noise that masks the signal. In this time-based approach, multiple "close by" integral multiples of the target frequencies (e.g., the half order and sixth order frequencies) may be processed using the Goertzel transform. In this approach, crank wheel tooth data durations or other signals (e.g., crankcase pressure, exhaust pressure) may be captured at a periodic rate, regardless of crank angle. When the "close by" integral multiples of the target frequencies undergo Goertzel processing, Parsevals theorem can be applied on the obtained different selected frequency signal energies.

For the crank angle-based approach, the Goertzel bin width is given by the equation K=(RPM/120)/(90*(RPM/60)/180). In one example where (90-1 crank wheel, N=180), K=1 for the half order.

In the time based approach, in one example, the half and/or sixth order frequencies may be referred to as the fundamental target frequencies, and the close-by frequencies may be identified according to the equations below, where RPM is engine speed in revolutions per minute, Fs is the sampling frequency (e.g., any periodic rate group, such as 10 ms) Hz, and N is the number of samples, the integral frequencies are given by the formula:

$$F_{n\pm z} = F_{n\pm z} * (F_s/N)$$

Target frequency 1 ($F_n$)—RPM/120 for ½ order
Target frequency 2 ($F_{n-2}$)—[RPM/120)−(2*Fs/N)] for ½ order
Target frequency 3 ($F_{n-1}$)—[(RPM/120)−(Fs/N)] for ½ order, [(RPM/10)−(Fs/N)] for $6^{th}$ order
Target frequency 4 ($F_{n+1}$)—[(RPM/120)+(Fs/N)] for ½ order, [(RPM/10)+(Fs/N)] for $6^{th}$ order
Target frequency 5 ($F_{n+2}$)−[(RPM/120)+(2*Fs/N)] for ½ order, [(RPM/10)+(2*Fs/N)] for $6^{th}$ order Thus, in one example, for the ½ order frequency, when engine speed is 900 RPM, Fs is 100 Hz (e.g., sampling every 10 ms), and N is 400, the target frequency 2 may be 7 Hz, the target frequency 3 may be 7.25 Hz, the target frequency 4 may be 7.75 Hz, and the target frequency 5 may be 8 Hz.

At 506, the final two terms of each Goertzel sum, $S_N$ and $S_{N-1}$, are output and passed on to a model at 508, where they are used to determine an amplitude and phase for each Goertzel sum as applied to each selected frequency component. Additional details regarding this model are presented below with respect to FIG. 7. Briefly, the plurality of $X_n$ samples collected during the engine cycle represent a signal that may be processed to determine the amplitude and phase of the signal. Based on the amplitude, it may be determined if knock is present, and if knock is present, the phase of the signal may be used to determine which cylinder is knocking.

At 510, method 500 includes applying Parsevals theorem to calculate a combined magnitude of each amplitude calculated for each selected frequency component of the time-based approach. In one example, each amplitude/magnitude output by the model (each corresponding to a given selected frequency component) may be combined according to the following equation, where E represents the magnitude/amplitude of each model output:

$$\text{Combined Energy} = |E1|^2 + 1E2|^2 + |E3|^2 + |E4|^2 + |E5|^2$$

At 512, method 500 includes determining if the combined magnitude is greater than a threshold magnitude. The threshold magnitude may be a suitable magnitude, such as a magnitude predetermined when no cylinders are knocking. If the magnitude is greater than the threshold, method 500 proceeds to 514 to indicate that knock is detected. At 516, method 500 optionally includes determining which cylinder is knocking based on the phase of the signal calculated above. At 518, one or more engine operating parameters may be adjusted and/or a notification of the misfire may be output. For example, cylinder knock may result when in-cylinder temperature exceeds a threshold limit. Thus, in response to detected knock, the temperature of the knocking cylinder may be reduced by deactivating the cylinder for a duration (e.g., by deactivating fuel injection, deactivating intake and/or exhaust valves), by adjusting ignition timing (such as by retarding sparking timing or retarding injection timing), by reducing boost pressure, or other suitable modification. Further, the output notification may include notifying an operator of the vehicle in which the engine is installed via an indicator light (malfunction indication lamp), for example, or setting a diagnostic code. Method 500 then returns.

If the amplitude is not greater than the threshold at 512, method 500 proceeds to 518 to indicate that no misfire is detected and maintain current operating parameters at 520. Method 500 then returns.

Thus, method 500 monitors for cylinder knock by analyzing torsional oscillations of the crankshaft created by the combusting cylinders. During operation with no knock, the torsional oscillations are relatively low. However, if a cylinder is knocking and thus contributing additional torque to the crankshaft, torsional oscillations may increase. These may be detected based on output from the crankshaft speed sensor.

In order to increase the accuracy of detecting knock via the crankshaft speed sensor output, the data collected in order to calculate the magnitude and phase may be collected only during a certain window or windows of the engine cycle where knock is expected to occur. As such, in some examples, at 502 of method 500, where the time between each tooth is determined, the time between each tooth may be determined only during one or more windows of the engine cycle. Knock occurs in the range of 10° to 70° ATDC for a given cylinder. Thus, samples can be collected within this range. In other examples where the samples are collected for the complete two revolutions of crank, the phase calculated from Goertzel algorithm should be within this range, and thus if the phase is out of the range, it may indicate that knock is not occurring and that other engine phenomena is contributing to the torsional vibrations. Additionally or alternatively, validation of the knock spectral results may be done with this right window. The calculated Goertzel phase should fall with in this range of crank angle (10 deg to 70 Deg ATDC) then with the combined magnitude/energy level greater than the threshold, knock and the cylinder may be detected. However, rather than using the combined magnitude described above, knock may be detected using a single fundamental frequency (e.g., half-order) when such windowing techniques are used. Another technique is based on specific regions of crank angles representing 10 deg to 70 deg ATDC, values can be captured within this range and the Goertzel sum applied to get a robust results of cylinder knock status. This will ensure false trigger scenarios, such as inlet/outlet valve closing timings, do not contribute to false knocking detection.

By utilizing the sensor output from the crankshaft speed sensor, direct knock sensors may be dispensed with, which may reduce costs. Further, direct knock sensors are inefficient during higher engine speeds, such as greater than 4000 RPM. During these high engine speeds, ignition timing may be retarded to avoid knocking. With the knock detection according to the disclosure, knock limit detection may be performed irrespective of engine speeds, and also cylinder specific knock control may be applied.

Further, in some examples, rather than relying on the crankshaft speed sensor, output from a crankcase pressure sensor (e.g., sensor 326 of FIG. 3) may be sampled and used to detect knock. In such cases, the method described above may be performed in a similar manner. The crankcase pressure sensor signal may be sampled with respect to crankshaft wheel tooth data, e.g., the crankcase pressure sensor signal may be sampled each time the crankshaft speed sensor outputs a measurement (such as each time a tooth of the wheel passes by the speed sensor) in order to correlate the crankcase pressure sensor data with engine timing data.

As described above, the knock monitor includes two portions, a first portion where the Goertzel sum is calculated on the collected crankshaft sensor output or crankcase pressure sensor output in order to output two terms, which are fed into the second portion of the knock monitor, where the two terms are used to calculate a phase and amplitude to detect knock and the cylinder in which the knock is occurring. Each portion of the monitor may be performed on a different level of logic in the controller. For example, the first portion may be performed on a lower level and the second portion may be performed on a higher level. This may include performing the two portions on different nodes, or performing them in different threads of a multi-thread processor.

Figure 6:
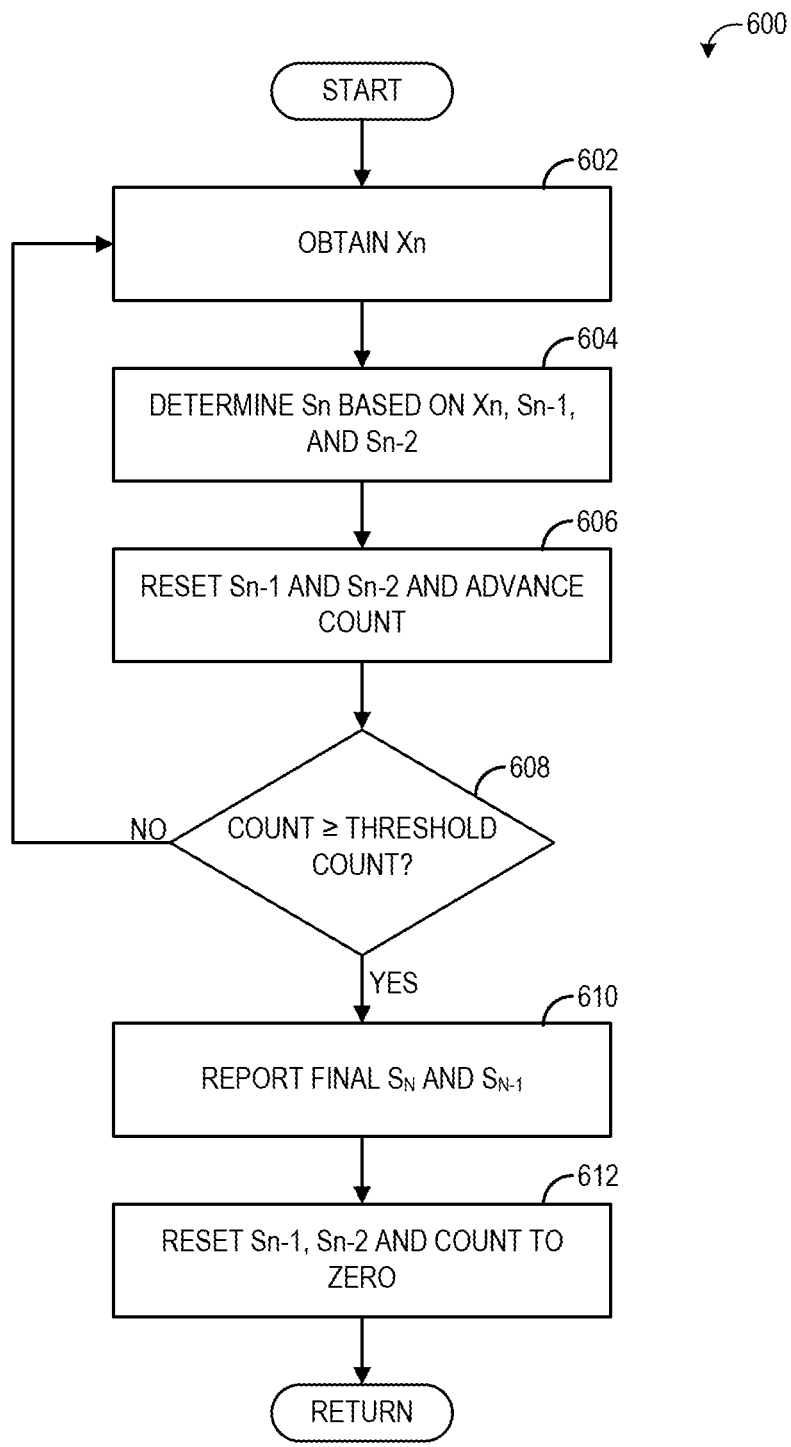
Figure 7:
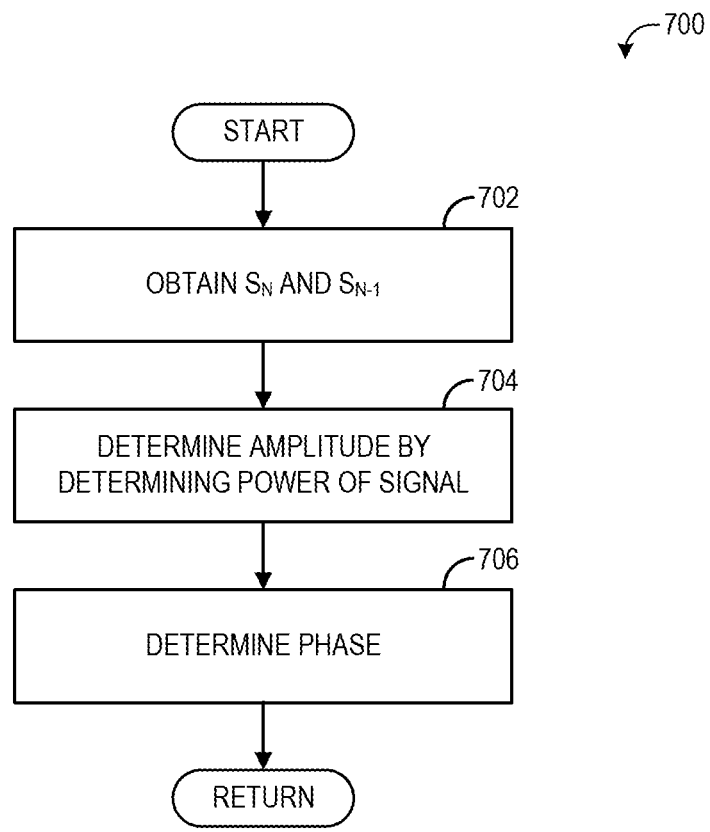
Figure 8:
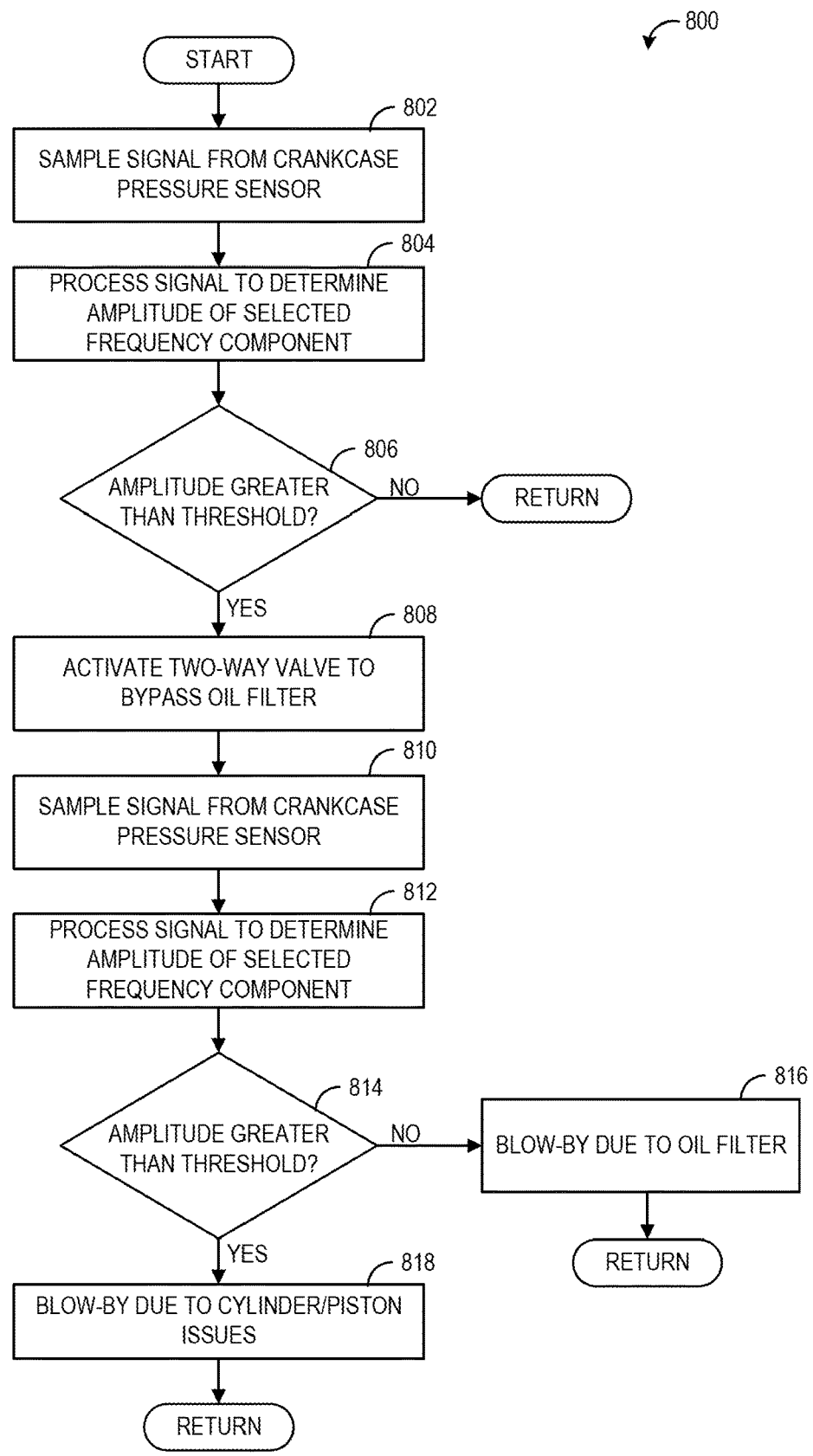
FIG. 8 is a flow chart illustrating a method for running a blow-by monitor.

FIGS. 6-7 illustrate the recursive Goertzel algorithm described above in greater detail, which uses the variation in the existing crankshaft position sensor tooth time intervals or the sampled crankcase pressure sensor intervals to calculate the torsional oscillation orders of the engine crankshaft to measure engine operation. The Goertzel recursive sum is calculated between the passage of timing teeth in the lower level of the controller. After one engine cycle, the final two terms of the sum are reported to the higher level control for the calculation of order magnitude and phase, which can be used to identify knocking cylinders. Single knocking cylinders show an increased half-order torsional vibrations and multiple knocking cylinders show increased first and higher orders (e.g., sixth order) in a four stroke engine.

Referring first to method 600 of FIG. 6, it illustrates the sample collection and recursive summation performed on the crankshaft sensor signal. However, it is to be understood that the method of FIG. 6 could be applied to other sensor signals that are collected with respect to the crankshaft sensor output, such as the crankcase pressure sensor signal. As explained previously, the engine crankshaft has a timing wheel with evenly spaced teeth to control the injection of the fuel at the correct angular position of the engine. The passage of each tooth is read by the controller. Even though the teeth are evenly spaced, the time between teeth, DT(n) (also referred to $X_n$) varies due to the torsional oscillation of the crankshaft caused by the pulsating nature of individual cylinders firing and the elastic properties of the crankshaft. When all the cylinders fire evenly, their torque impulses into the crankshaft are fairly equal and the phase difference between the cylinders result in a low, net value of the lower torsional orders. When one cylinder's torque is lower or higher, then the rest of the torque values do not cancel out, and a higher net value of the crankshaft torsional orders can be calculated. It may be more efficient to calculate the Goertzel recursive sum terms between the passage of individual timing teeth in the lower part of the controller.

Thus, at 602, method 600 includes obtaining an $X_n$ value calculated as described above (e.g., the amount of time between when the crankshaft speed sensor detects a first tooth and when the sensor detects a second tooth, where the second tooth is the immediately adjacent tooth to the first tooth). At 604, a first term $S_n$ is determined based on $X_n$, $S_{n-1}$, and $S_{n-2}$. To determine $S_n$, the obtained $X_n$ value is entered into the equation $S_n = X_n + \text{Coeff}*S_{n-1} - S_{n-2}$, where the value of coeff depends on the order being calculated (e.g., half-order, first order, etc.) and where $S_{n-1}$ and $S_{n-2}$ are the prior two calculated $S_n$. In one example, Coeff may be determined by the equation: 2

$$\cos\frac{2\pi k}{N}$$

where N is the number of samples and k is the target frequency bin (Ft/Fr, where Ft is the target frequency and Fr is the frequency resolution determined by Fs/N).

In some examples, as described above with respect to FIG. 5, the $X_n$ value may input into more than one equation, where each equation has a different coefficient reflective of the selected frequency component.

After $S_n$ is calculated, $S_{n-1}$ is set to $S_{n-2}$, $S_n$ is set to $S_{n-1}$, and the sample count is incremented by one at 606. It is then determined at 608 if the sample count is equal to or greater than a threshold count. The threshold count may be the number of teeth that the sensor detects in one full engine cycle (e.g., two rotations of the crankshaft and thus two times the number of teeth on the wheel), or other suitable count that indicates enough data has been collected to enable a determination of the torsional vibration order(s). In one example where the wheel has 90 teeth, the count may be 180. In another embodiment, the controller may read, via the crankshaft sensor, more than one tooth of the timing wheel at a time. For example, the crankshaft sensor may capture four teeth at a time. As a result, the controller may read 45 samples for a crankshaft wheel having 90 teeth. In another example, if the crankshaft wheel has 90 teeth and the controller can capture two teeth at a time, then 90 samples may be taken. In this way, the count may change based on the number of teeth sampled at one time in the case of the crank angle-based approach. In the case of the time-based approach, the number of samples may be of variable count which should be at least of a size where the signal is free from distortion.

If the count is not greater than the threshold count, method 600 loops back to 602 and $S_n$ is calculated for the next $X_n$. If the count is equal to or greater than the threshold count, the two final terms, $S_N$ and $S_{N-1}$, are output at 610, and all the values are reset to zero at 612 to start over for a next engine cycle. In this way, the sum is performed for all the teeth in two revolutions of the crankshaft, and then the amplitude is calculated (described below).

The last two sum terms, $S_N$ and $S_{N-1}$ are reported to higher level logic of the controller where the magnitude and phase of the torsional vibration order frequency are calculated for that engine cycle. The amplitude and/or phase can be used to identify knocking cylinders in one example, used to identify misfiring cylinders in another example, or other suitable determination. While the methods herein have been described with respect to determining the last two sum terms on the lower level of logic and reporting them to the higher level of logic for further processing, other configurations are possible. For example, the tooth data (e.g., amount of time between the passing of each tooth or multiple teeth of the wheel) may passed from the lower level to the higher level, and all the calculations may be performed on the higher level.

FIG. 7 is a flow chart illustrating a method 700 for determining an amplitude and phase of the frequency analyzed in method 600. At 702, method 700 includes obtaining $S_N$ and $S_{N-1}$ from the lower level logic of the controller. As explained above with respect to FIG. 6, $S_N$ and $S_{N-1}$ are the final two terms output from the recursive Goertzel algorithm. As such, $S_N$ and $S_{N-1}$ represent the desired frequency component (e.g., half order) for the entire sampled signal, and include real and imaginary frequency components. The magnitude (e.g., amplitude) and phase of the signal can be determined from these two terms. Thus, at 704, the amplitude is determined based on a signal power determination. The two final terms are entered into an equation to calculate the amplitude:

$$\text{Amp} = ((S_N * w_r - S_{N-1})^2 + (S_N * w_i)^2)^{1/2} * 2/N$$

In the above equation, $W_r$ represents a real value of w (e.g., the cosine of w), where $w = (2\pi/N)*k$ and k is a constant based on a sample size, target frequency, and sample frequency. In the above equation, $W_i$ represents an imaginary value of w (e.g., the sine of w).

At 706, the phase may be calculated according to the following equation:

$$\text{Phase} = (\text{ATAN } 2(S_N * w_r - S_{N-1}, S_N * w_i) * 2 + \text{Off})$$

In the above equation, A TAN 2 may refer to an arctangent with two arguments function, and Off may be an offset, which in one example may be based on the engine position at the start of the engine cycle. As described above, the amplitude (which is also referred to as the magnitude herein) may be compared to a threshold to determine if knock is present. If knock is present, the phase may indicate which cylinder knocked. In one example, if no knock is present, the phase calculated above may not provide useful information, and thus calculation of the phase may be dispensed with if no knock is present. If knock is present, the phase relative to the starting position of the engine may be used to determine which cylinder is undergoing knocking. In the time-based approach, as the samples are collected out of the crank angle, the phase and hence cylinder identification is limited.

Thus, the methods 500, 600, and 700 presented above may be used to detect cylinder knock with a Goertzel algorithm that calculates the Fourier coefficients by looking at RPM/Crank tooth values (as per the dt between teeth zero crossings). The spatial Goertzel does not utilize memory to store any data points, thus lowering computational resources and increasing the efficiency of the controller. The crankcase pressure values combined with per tooth crossing algorithm can also be used to identify the location of the knock mode in the engine by looking at phase of Goertzel filter and correlating it to firing order of the engine. Samples can also be collected based on the proper window of occurrence to avoid wrong or missed knock detections. In the case of the time-based approach, the Goertzel sum may be implemented on seven different fundamental shock wave frequencies applied with Parsevals energy theorem to detect the strength or occurrence of knock and phase properly aligned with crank wheel and right window (10 deg to 70 deg ATDC) will determine the cylinder which is knocking. The window selection can also be based on spark ignition timings in the case of gasoline engine or the time of diesel injections in case of multi-fuel engines (e.g., diesel and gaseous fuel such as LNG). For duel fuel, spark ignition will be similar to point of injector diesel fuel injection. Thus, the window selection should be point of spark ignition with gasoline engine until 70° ATDC and point of diesel injection with duel fuel engine until 70° ATDC.

Turning now to FIG. 8, a method 800 for running a blow-by monitor is presented. Method 800 may be carried out a control unit, such as controller 110, according to non-transitory instructions stored thereon. Method 800 may be carried out as part of method 400 (e.g., in response to the conditions being met for diagnosing the engine) or method 800 may be carried out independently of method 400.

At 802, method 800 samples a signal output from a crankcase pressure sensor, such as sensor 326 of FIG. 3. The crankcase pressure sensor output may be collected/sampled with respect to the teeth of the crankshaft speed wheel, as explained above. At 804, method 800 processes the signal to determine the amplitude of a selected frequency component. In one example, the selected frequency component may be the half-order frequency component. In another example, the selected frequency component may be the first order frequency component. The amplitude of the signal may be determined using a recursive sum spectral analysis. In one example, the amplitude may be determined according to the method of FIG. 6 described above.

At 806, method 800 determines if the amplitude is greater than a threshold amplitude. The threshold amplitude may be an amplitude calculated when no or minimal blow-by is occurring in the engine. If the amplitude is not greater than the threshold, no significant blow-by is occurring, and thus method 800 returns. If the amplitude is greater than the threshold, blow-by may be occurring in the engine. However, the crankcase pressure variations detected by the spectral analysis may also be due to a clogged oil filter in the crankcase ventilation system. Thus, to differentiate the potential causes of the crankcase pressure variations, method 800 proceeds to 808 to activate a two-way valve in the crankcase ventilation system to bypass the crankcase vapors around the oil filter. In one example, as shown in FIG. 3, the two-way valve may, in its default position, allow the flow of crankcase vapors to the oil filter. In the activated position, the two-way valve may instead flow the crankcase vapors back to the crankcase.

At 810, the signal from the crankcase pressure sensor is again sampled, and at 812 the signal is processed to determine the amplitude of the selected frequency component (e.g., half order of first order), as described above with respect to 804 of method 800. At 814, method 800 determines if the amplitude is greater than the threshold amplitude. If the amplitude is not greater than the threshold, method 800 proceeds to 816 to indicate that the pressure variations originally detected at 806 are due to a clogged oil filter. Owing to the bypass of the crankcase vapors around the oil filter and subsequent disappearance of the pressure variations, it may be concluded that the clogged oil filter was the cause of the variations. When the oil filter condition is detected, a notification may be output to an operator to service the oil filter. Method 800 then returns.

If the amplitude is greater than the threshold, method 800 proceeds to 818 to indicate that the pressure variations are due to blow-by caused by cylinder and/or piston issues, such as a scuffed liner or degraded ring. In such examples, an operator may be notified and engine operating parameters may be adjusted, such as derating engine power, reducing a fuel injection amount to the cylinder experiencing blow-by, etc. Method 800 the returns.

Thus, engine blow by may be measured with Fast Fourier Transform technique with an input of crankcase over pressure values. By properly selecting the bin values of the half order or first order harmonic components, power values calculated from transform technique (e.g., Goertzel) will determine and differentiate between the blow by component reasons. However, such a technique is inefficient in detecting the actual blow by reason, if it is caused by clogged coalescer which is used in high efficient oil separators. If the blow by is happening or crankcase pressure sensor frequency spectral variations are due to coalescer clogging, then it is difficult to differentiate the blow by reasons.

When blow by is detected, the blow by detection algorithm can be triggered to find the magnitude or power values of Goertzel algorithm. This detection mechanism may be performed automatically via manipulation of the two-way valve, as described. In other examples, it may performed in a service center, with the bypassing of the oil filter performed manually (e.g., mechanically removing the line from the crankcase to the filter).

Positive Crank Case Ventilations systems techniques will remove the blow by gas by separating the oil via the oil filter and circulating back the filtered clean gas into atmosphere or to the direct air intake path. Whenever there is a blow by detected, the hydraulic path of Positive Crank case Ventilation (PCV) may be modified with electronically controlled two way valve actuators or manual removal of PCV path to intake path, and then the crankcase pressure samples can be processed by Goertzel algorithm. If the spectral results of values results in Goertzel lower magnitude or power compared to the healthy threshold limits, then it may be determined that the excess blow by is because of oil filter coalescer clogging.

In this way, once a magnitude or energy level higher than a blow-by threshold is detected, the coalescer path is diverted and the Goertzel spectral analysis is performed on the sampled crankcase pressure signal. If the magnitude and energy is still greater than the threshold, then it is determined that the blow-by is a result of the cylinders. If the problem is resolved (e.g., if the magnitude returns to being lower than the threshold), then it is determined that the coalescer is blocked. However, an observation in the case of the coalescer being blocking is that the magnitude and energy are not reaching the threshold but the crankcase pressure signal is increasing. In other words, clogging of the coalescer may be indicated when the Goertzel magnitude is under the threshold but the crankcase pressure signal itself is high.

FIG. 9 is a flow chart illustrating a method 900 for running a misfire monitor. Method 900 may be carried out a control unit, such as controller 110, according to non-transitory instructions stored thereon. Method 900 may be carried out as part of method 400 (e.g., in response to the conditions being met for diagnosing the engine) or method 900 may be carried out independently of method 400.

At 902, method 900 determines operating parameters. The determined operating parameters may include time since an engine start, duration since a pervious monitor was initiated, engine speed and load, etc. At 904, method 900 includes determining if conditions for a cylinder pop test are met. A pop test may include, during engine idle operation or other low load condition, each cylinder being sequentially over-fueled until a "pop" sound is heard. Absence of such a pop sound may indicate cylinder issues, such as a degraded fuel injector. However, the pop test is fuel-intensive and may not accurately detect subtle combustion issues. Thus, according to embodiments disclosed herein, during the pop test, output one or more exhaust gas parameter sensors may be collected for each over-fueling event, processed according to the Goertzel recursive sum described above to determine the amplitude of the half-order frequency component of the signal, for example, and compared to a threshold in order to determine if a given cylinder is misfiring. By analyzing the output from the exhaust gas sensor, the amount of fuel supplied to each cylinder during the over-fueling events may be reduced.

The conditions for carrying out the pop test may include a threshold amount of time (or distance or engine cycles) having elapsed since a previous pop test was carried out. Further, the pop test may be carried out during low engine speed conditions, such as less than 440 RPM. As such, the conditions for carrying out the pop test may include engine idle conditions or during an engine start.

If the conditions for carrying out the pop test are not met, method 900 returns to continue monitor conditions until the conditions are met. Once the conditions are met, method 900 proceeds to 906 to over-fuel a first cylinder of the engine. The first cylinder may be over-fueled by a specific amount for a specific duration (e.g., 2-10 seconds). During the period of over-fueling, the amplitude/power level of a selected frequency component of an exhaust gas parameter sensor is obtained, as indicated at 908. The exhaust gas parameter sensor may be a temperature sensor in one example. In another example, the exhaust gas parameter sensor may be a pressure sensor. In a still further example, the exhaust gas parameter sensor may be a composition sensor, such as a sensor that detects oxygen or NOx concentration. For example, the half-order power level for the oxygen concentration signal may be obtained, similar to the calculation described above with respect to FIGS. 6 and 7.

At 910, the process is repeated sequentially for each cylinder. For example, the fueling of the first cylinder is returned to normal fueling amounts and a second cylinder is over-fueled. The half-order amplitude is then obtained. At 912, method 900 indicates cylinder misfire based on the amplitude(s). In one example, cylinder misfire may be indicated when a half-order amplitude is less than a healthy cylinder threshold. During the low engine speed conditions of the pop test, a cylinder that is degraded (e.g., misfiring) may be indistinguishable from a healthy cylinder. However, when a cylinder is over-fueled during the low engine speed conditions, the half-order amplitude increases significantly, such as to 5 or greater. Thus, if an over-fueled cylinder does not exhibit increased half-order amplitude, the cylinder may be misfiring, weak, or otherwise degraded. When a degradation condition is detected of one or more cylinders of the engine, engine operating parameters may be adjusted, similar to the adjustments explained above with respect to FIG. 4. Method 900 then returns.

Thus, in one example, the cylinder misfire may be detected with NOx or O2 sensor results during a pop test. The pop test is a continuous pre-defined over fueling of individual cylinders for specified time and pattern. During this phase, over fueling will be detected by the NOx or O2 sensor O2 binary values. The NOx sensor may display three values, a binary lambda, a linear lambda in %, and a NOx mass in ppm. The binary lambda will be true or false based on rich or lean mixture in the exhaust. During the pop test whenever an individual cylinder is over fueled, this can be detected by the NOx sensor binary lambda values. As the pop is a timing based system function, cylinder misfire can be easily detection with gas ionization levels. The detection capability may be extended towards notched behavior by processing the NOx sensor O2 or NOx values with Goertzel algorithm and thereby with gas transportation delay, cylinder misfire can be detected. However based on the sensor position in the exhaust, gas transportation delay has to be considered based on exhaust mass flow and other engine operating data.

In case of notched loads misfire detection process, O2 or NOx values may be captured in accordance with crank angle to have a reference of cylinder identification, otherwise the misfiring cylinder cannot be identified. The Goertzel phase may determine the cylinder identification, but the gas transportation delay may be converted into a phase offset to determine the right cylinder and for bin value ½ order or $1^{st}$ order spectral components can be used to find the misfire.

In case of pop or port heating modes, instead of Goertzel spectral results a direct sensor measurement with timings may be used trace the misfire along with gas transportation delay. However, the spectral results during pop test can also contribute to find the sensor sensitiveness or offset. Sensor sensitiveness or offset are vital component in determining the senor healthiness. Thus, Goertzel power values during this specific mode (Pop) with new sensor can act as a base and the values after aging results in deviation which can determine the offset or sensitiveness of the sensor. The O2 or NOx sensor can be adapted with this self-learning during specific modes like pop.

In another example, the Goertzel results of exhaust pressure and exhaust temperature may be monitored during the pop test mode. A change values will be observed in the frequency spectrum by selecting the proper fundamental frequency (e.g., ½ order component/$1^{st}/6^{th}$ etc.,) with significant change in the fuel quantity. Spectral response behave may be relative to the over fuel quantity and any misfire during the course of operation. Fluctuations/reductions in the physical quantities will be captured and can be used to detect misfires.

Here the pressure sensor values can be captured during the pop mode aligned with Crank angle. Captured values will undergo Goertzel processing which will determine Power and phase and in turn identify the misfired cylinder. Another method is to capture temperatures sensor values, Time based observation or processing with Goertzel will result in detecting particular cylinder misfire.

The temperature profile with respect to pop mode status can be measured. In case of the pre-turbine right bank pressure sensor (PTRT), during the pop test, first the left bank cylinder will get over fueled and then right bank. This is the reason the temperature profile is low during first bank firing. In case of the left bank sensor (PTLT), the temperature will increase and once after 30 seconds of Pop bank shift, right bank starts over fueling. So, the temperature will decline for PTLT sensor. However, in the case of a misfiring cylinder on the left bank, in this case, PTRT is unaffected. But PTLT sees a sudden change during the misfire operation.

Both PTLT and PTRT can undergo in parallel Goertzel processing with ½ order or $1^{st}$ order during pop operation. Fluctuations can be observed with Goertzel temperature magnitude or power, where the phase will provide information about cylinder identification. Even time based processing will also help easily to detect the cylinder without having the phase information.

In case of the exhaust pressure sensor, the values can be captured with respect to crank angle or missed tooth. Captured values should undergo Goertzel processing with identified fundamental frequency component. This method can also be applied during notched modes. As the Pop mode is very well defined with timings, cross verification or model run time validation is possible. In case of exhaust temperature, during Pop operation PTLT/PTRT/Temperature profile can be captured with respect to crank angle. Values can be processed with right fundamental component. Goertzel processing will result in Magnitude of misfire and phase will determine the exact cylinder which will misfire. A time based approached with or without Goertzel processing can also result in the exact misfire detection.

Thus, if a cylinder is cut out, or stops functioning, the exhaust gas parameters from that cylinder will be different than the rest of the contributing cylinders. For example, the temperature may be lower, the pressure may be lower, and/or the NOx or O2 levels may be lower or higher, respectively. For a V12, four stroke engine, each cylinder fires once every other revolution of the crankshaft. Therefore, each cylinder will have a specific exhaust gas contribution that can be identified in a half order spectral analysis of the exhaust gas parameter sensors. Similarly, if one cylinder starts to over-fuel for some reason, the contribution onto the exhaust gas will once again be specific and thus identifiable in a spectral analysis of the exhaust gas parameter sensor.

Once the cylinder degradation is identified, the control system may take necessary adjustments to optimize engine performance, efficiency, and emissions compliance routines. If indicated, the control system may also cut all fueling to the degraded cylinder to help protect the engine of any further secondary degradation that may occur.

At low engine speeds, it is typical for healthy cylinders to misfire, as the injectors are at the low end of their operational range. This makes it difficult to detect a cut out cylinder using spectral analysis, as the power levels seen between a healthy engine and an engine with a cut out cylinder are overlapping and there is no clear separation that may be used to identify the cut out cylinder. The method described above with respect to FIG. 9 overcomes these obstacles by combining spectral analysis with a pop test. During a pop test, each cylinder is over-fueled in a specific order for a specific duration. A healthy cylinder being over-fueled will have a relatively high half order power level, while a cut out cylinder will have a relatively low half order power level. The control system may utilize this separation in power levels to determine health of the individual cylinders at low engine speeds. Once the control system determines there is a cylinder working at less than full health, it can then take specific action around that cylinder to either optimize performance of the engine given a compromised cylinder or cut fueling to that cylinder to help protect the engine from further degradation. For example, an engine controller system can take action to adjust EGR rates and valves accordingly to adequately compensate for a lack of an injector firing as intended. This adjustment could be made to help maintain emissions compliance to a certain degree even with a compromised system. The controller could also derate overall load or power on the engine to help mitigate progression of a degradation and allow the vehicle enough opportunity to limp back home.

The pop test spectral analysis approach described herein may also be used to drive different degrees of injector health over time. As an injector starts to degrade over time, the impact on the half order or frequency content in the exhaust pressure system will start to drift and gradually increase. A threshold based approach may be taken to drive proactive maintenance, etc.

An embodiment relates to a system including a sensor configured to measure a parameter of an engine having a plurality of cylinders and a controller configured to sample a signal output from the sensor; process the sampled signal to determine a respective magnitude for each of one or more selected frequency components of the sampled signal, the respective magnitude for each of one or more selected frequency components determined according to a recursive sum spectral analysis of the sampled signal; diagnose a condition of the engine based on the respective magnitude for each of the one or more selected frequency components; and adjust one or more engine operating parameters responsive to the diagnosing.

In an example, the sensor is a crankshaft speed sensor, the respective magnitude for each of one or more selected frequency components is a half-order magnitude of a half-order frequency component of the sampled signal, and the condition of the engine is cylinder knock. The controller is configured to identify the cylinder knock when the half-order magnitude is greater than a threshold magnitude.

In an example, the sensor is a crankcase pressure sensor, and the controller is configured to sample the signal from the crankcase pressure sensor at a timing corresponding to sample timing of a crankshaft speed sensor. The respective magnitude for each of one or more selected frequency components is a half-order magnitude of a half-order frequency component of the sampled signal, and the condition of the engine is cylinder knock. The controller is configured to identify the cylinder knock when the half-order magnitude is greater than a threshold magnitude.

In an example, the sensor is a crankcase pressure sensor, and to process the sampled signal, the controller is configured to process the sampled signal to determine a change in magnitude of a half-order frequency component of the sampled signal, and the condition of the engine is a degraded component of a positive crankcase ventilation (PCV) system. The controller is configured to diagnose the degraded component of the PCV system when the change in magnitude is greater than a threshold change. The change in magnitude may include a difference between a first magnitude when the PCV system is active and a second magnitude when the PCV system is inactive. The component of the PCV system may include an oil filter. In one example, the PCV system may be active when an engine coupled to the crankcase is operating and the crankcase is fluidically coupled to an intake of the engine via the oil filter. The PCV system may be inactive when the engine is operating and the PCV is not fluidically coupled to the intake via the oil filter. The controller may be configured to, when the change in magnitude is not greater than the threshold change and the first magnitude is greater than a threshold magnitude, diagnose degradation of a cylinder component. Degradation of the cylinder component may include a degraded cylinder liner, piston ring, or other component that may result in extra cylinder gas (e.g., exhaust gas) being directed to the crankcase.

In an example, the sensor is an exhaust NOx sensor, the respective magnitude for each of one or more selected frequency components is a half-order magnitude of a half-order frequency component of the sampled signal, and the condition of the engine is cylinder misfire. The controller is configured to diagnose the cylinder misfire when the half-order magnitude is greater than a threshold magnitude.

In an example, the sensor is an exhaust pressure sensor or an exhaust temperature sensor, the respective magnitude for each of one or more selected frequency components is a half-order magnitude of a half-order frequency component of the sampled signal, and the condition of the engine is cylinder knock. The controller is configured to diagnose the cylinder misfire when the half-order magnitude is greater than a threshold.

In examples, the controller is configured to adjust one or more engine operating parameters by adjusting a fuel injection amount or timing.

Another embodiment of a system includes an engine having a plurality of cylinders coupled to a crankshaft; a crankshaft speed sensor; and a controller configured to sample output from the crankshaft speed sensor; detect cylinder knock based on the sampled output from the crankshaft speed sensor; and adjust one or more engine operating parameters responsive to the detection of cylinder knock.

In an example, the controller is configured to detect cylinder knock based on the output from the crankshaft speed sensor independent of output from a knock sensor. For example, the crankshaft speed sensor may be used to determine engine speed, which may be used by the controller to adjust various engine operating parameters, such as exhaust gas recirculation amount, turbine speed, etc. The output from the crankshaft speed sensor may also be used to detect cylinder knock. In this way, dedicated knock sensor(s), which may detect the vibrations caused by knocking, may be dispensed with, thus lowering the cost and complexity of the engine.

In an example, the controller is configured to process the sampled output to obtain a half order frequency component of the sampled output from the crankshaft speed sensor; determine a magnitude of the half order frequency component; and indicate cylinder knock in one cylinder of the engine if the magnitude is greater than a threshold magnitude. The controller may be configured to, responsive to indicating the cylinder knock in one cylinder, identify which cylinder is knocking based on a phase of a selected frequency component signal of the output from the crankshaft speed sensor.

In an example, the controller is configured to process the sampled output to obtain a sixth order frequency component of the sampled output from the crankshaft speed sensor; determine a magnitude of the sixth order frequency signal; and indicate cylinder knock in each cylinder of the engine if the magnitude is greater than a threshold magnitude.

In an example, the controller is configured to process the sampled output to obtain a plurality of magnitudes each corresponding to a respective frequency component and indicate cylinder knock when a combined magnitude of each of the plurality of magnitudes is greater than a threshold magnitude.

In examples, the controller is configured to adjust one or more engine operating parameters by adjusting a fuel injection amount to a knocking cylinder.

A further example of a system includes an engine having a plurality of cylinders coupled to a crankshaft; a crankshaft speed sensor; and a controller configured to sample a signal output from the crankshaft speed sensor; process the sampled signal to determine a magnitude of a selected frequency component of the signal, the magnitude determined from the signal sampled during a given range of piston positions for a cylinder of the engine; detect cylinder knock of the cylinder when the magnitude exceeds a threshold magnitude; and adjust one or more engine operating parameters responsive to the detection of cylinder knock.

In an example, the given range of piston positions comprises ten to seventy degrees after top dead center. In a further example, the controller is configured to process the sampled signal to obtain a plurality of magnitudes each corresponding to a respective frequency component and indicate cylinder knock when a combined magnitude of each of the plurality of magnitudes is greater than a second threshold magnitude. The controller may be configured to adjust one or more engine operating parameters by adjusting a fuel injection amount to a knocking cylinder.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a crankcase pressure sensor configured to measure crankcase pressure of an engine having a plurality of cylinders; and
a controller configured to:
sample a signal output from the crankcase pressure sensor;
process the sampled signal to determine a half-order magnitude of a half-order frequency component of the sampled signal;
diagnose a condition of the engine based on a change in the half-order magnitude of the half-order frequency component, including diagnosing a degraded component of a positive crankcase ventilation (PCV) system when the change in the half-order magnitude is greater than a threshold change;

adjust one or more engine operating parameters responsive to the diagnosing; and
wherein the controller is configured to adjust one or more engine operating parameters by adjusting a fuel injection amount or timing.

2. The system of claim 1, further comprising
a crankshaft speed sensor,
wherein the controller is configured to sample a speed signal output by the crankshaft speed sensor and process the sampled speed signal to determine the half-order magnitude of the half-order frequency component of the sampled speed signal; and
the controller is configured to diagnose cylinder knock when the half-order magnitude of the sampled speed signal is greater than a threshold magnitude.

3. The system of claim 1,
wherein the controller is configured to sample the signal from the crankcase pressure sensor at a timing corresponding to sample timing of a crankshaft speed sensor; and
wherein the controller is configured to diagnose cylinder knock when the half-order magnitude of the half-order frequency component of the sampled signal from the crankcase pressure sensor is greater than a threshold magnitude.

4. The system of claim 1, wherein the change in the half-order magnitude includes a difference between a first half-order magnitude when the PCV system is active and a second half-order magnitude when the PCV system is inactive, and wherein the component of the PCV system comprises an oil filter.

5. The system of claim 4, wherein the controller is configured to:
when the change in the half-order magnitude is not greater than the threshold change and the first half-order magnitude is greater than a threshold magnitude, diagnose degradation of a cylinder component.

6. The system of claim 1,
further comprising an exhaust NOx sensor;
wherein the controller is configured to sample a NOx signal output from the exhaust NOx sensor during low engine speed conditions where each cylinder is sequentially over-fueled and process the sampled NOx signal to determine a half-order magnitude of a half-order frequency component of the sampled NOx signal; and
wherein the controller is configured to diagnose cylinder misfire when the half-order magnitude of the sampled NOx signal is greater than a threshold magnitude.

7. The system of claim 1,
further comprising an exhaust pressure sensor or an exhaust temperature sensor;
wherein the controller is configured to sample a second signal output by the exhaust pressure sensor or exhaust temperature signal and process the sampled second signal to determine a half-order magnitude of a half-order frequency component of the sampled second signal; and
wherein the controller is configured to diagnose cylinder misfire when the half-order magnitude of the sampled second signal is greater than a threshold magnitude.

8. A system comprising:
an engine having a plurality of cylinders coupled to a crankshaft;
a crankshaft speed sensor; and
a controller configured to:
sample output from the crankshaft speed sensor;
process the sampled output to obtain a plurality of magnitudes each corresponding to a respective frequency component;
sum each of the plurality of magnitudes to generate a combined magnitude;
indicate cylinder knock in one cylinder based on a selected frequency component of the sampled output from the crankshaft speed sensor, including indicating cylinder knock when the combined magnitude is greater than a threshold magnitude;
responsive to indicating cylinder knock in the one cylinder, identify which cylinder is knocking based on a phase of a selected frequency component signal of the output from the crankshaft speed sensor; and
adjust a fuel injection amount to the knocking cylinder.

9. The system of claim 8, wherein the controller is configured to detect the cylinder knock based on the output from the crankshaft speed sensor independent of output from a knock sensor.

10. The system of claim 8, wherein the controller is configured to:
process the sampled output to obtain a half order frequency component of the sampled output from the crankshaft speed sensor;
determine a magnitude of the half order frequency component; and
indicate cylinder knock in the one cylinder of the engine if the magnitude is greater than a threshold magnitude.

11. The system of claim 8, wherein the controller is configured to:
process the sampled output to obtain a sixth order frequency component of the sampled output from the crankshaft speed sensor;
determine a magnitude of the sixth order frequency signal; and
indicate cylinder knock in each cylinder of the engine if the magnitude is greater than a threshold magnitude.

12. A system comprising:
an engine having a plurality of cylinders coupled to a crankshaft;
a crankshaft speed sensor; and
a controller configured to:
sample a signal output from the crankshaft speed sensor;
process the sampled signal to determine a plurality of magnitudes each corresponding to a respective frequency component of the signal, the plurality of magnitudes determined from the signal sampled during a given range of piston positions for a cylinder of the engine;
sum each of the plurality of magnitudes to generate a combined magnitude;
detect cylinder knock of the cylinder when the combined magnitude exceeds a threshold magnitude;
adjust one or more engine operating parameters responsive to the detection of cylinder knock; and
wherein the controller is configured to adjust one or more engine operating parameters by adjusting a fuel injection amount to a knocking cylinder.

13. The system of claim 12, wherein the given range of piston positions comprises ten to seventy degrees after top dead center.

14. The system of claim 2, wherein the controller is configured to process the sampled speed signal to obtain a plurality of additional magnitudes each corresponding to a respective additional frequency component of the sampled speed signal, sum each of the plurality of additional magnitudes and the half-order magnitude of the sampled speed signal to generate a combined magnitude, and indicate cylinder knock when the combined magnitude is greater than the threshold magnitude.

* * * * *